(12) United States Patent
DeFazio et al.

(10) Patent No.: US 8,292,007 B2
(45) Date of Patent: Oct. 23, 2012

(54) WHEELED PLATFORMS

(75) Inventors: Thomas L. DeFazio, Watertown, MA (US); David S. Barrett, Needham, MA (US); Chikyung Won, Tewksbury, MA (US); Selma Svendson, Andover, MA (US)

(73) Assignee: iRobot Corporation, Bedford, MA (US)

( * ) Notice: Subject to any disclaimer, the term of this patent is extended or adjusted under 35 U.S.C. 154(b) by 271 days.

(21) Appl. No.: 12/139,605

(22) Filed: Jun. 16, 2008

(65) Prior Publication Data

US 2010/0001478 A1 Jan. 7, 2010

Related U.S. Application Data

(63) Continuation of application No. 12/023,561, filed on Jan. 31, 2008, which is a continuation of application No. 10/614,739, filed on Jul. 7, 2003, now Pat. No. 7,363,994, which is a continuation of application No. 09/826,209, filed on Apr. 4, 2001, now Pat. No. 6,662,889.

(60) Provisional application No. 60/194,922, filed on Apr. 4, 2000.

(51) Int. Cl.
  *B62D 55/075* (2006.01)
  *B62D 57/00* (2006.01)
(52) U.S. Cl. .............................. 180/9.32; 180/8.2
(58) Field of Classification Search ............. 280/5.28, 280/5.32, 5.24, 5.2, 5.26, 763.1, 764.1; 180/8.2, 180/8.3, 8.5, 20, 21, 24
See application file for complete search history.

(56) References Cited

U.S. PATENT DOCUMENTS

| | | | |
|---|---|---|---|
| 1,069,761 A | | 8/1913 | Buckley |
| 2,917,120 A | | 12/1959 | Gates et al. |
| 3,166,138 A | | 1/1965 | Dunn, Jr. |
| 3,235,020 A | | 2/1966 | Bekker |
| 3,295,858 A | * | 1/1967 | Addison, Jr. ............. 280/5.3 |
| 3,311,424 A | | 3/1967 | Taylor |
| 3,489,236 A | | 1/1970 | Goodwin |
| 3,533,483 A | * | 10/1970 | Ballinger ............... 180/9.38 |
| 3,540,151 A | | 11/1970 | Ishida |
| 3,799,362 A | | 3/1974 | Oswald et al. |
| 3,809,004 A | | 5/1974 | Leonheart |
| 4,009,761 A | | 3/1977 | Meyer |
| 4,027,889 A | | 6/1977 | Krofchalk et al. |
| 4,247,125 A | | 1/1981 | Rayment |
| 4,369,989 A | * | 1/1983 | Mankey ................ 280/764.1 |
| 4,477,998 A | | 10/1984 | You |
| 4,483,407 A | | 11/1984 | Iwamoto et al. |
| 4,492,058 A | | 1/1985 | Goldfarb et al. |

(Continued)

FOREIGN PATENT DOCUMENTS

DE  1630748  1/1971

(Continued)

*Primary Examiner* — Lesley D Morris
*Assistant Examiner* — Daniel Yeagley
(74) *Attorney, Agent, or Firm* — Fish & Richardson P.C.

(57) ABSTRACT

A wheeled platform 100 is disclosed, which is characterized by high mobility and reliability, and which can be used in a wide range of applications including transport and robotic devices. The wheeled platform 100 has fore and aft body portions 130, 132, each body portion 130, 132 having first and second sides 106, 108. Overlapping wheels 112, 114, 116, 118 are rotatably attached to the first side 106 and overlapping wheels 120, 122, 124, 126 are rotatably attached to the second side 108. The fore body portion 130 can be connected to the aft body portion 132 via an articulation element 133.

15 Claims, 17 Drawing Sheets

U.S. PATENT DOCUMENTS

| | | |
|---|---|---|
| 4,566,550 A | 1/1986 | Misawa |
| 4,566,551 A | 1/1986 | Feliz |
| 4,645,222 A | 2/1987 | Hester |
| 4,674,585 A | 6/1987 | Barlow et al. |
| 4,687,068 A | 8/1987 | Pagett |
| 4,688,813 A | 8/1987 | Misawa et al. |
| 4,702,331 A | 10/1987 | Hagihara et al. |
| 4,709,773 A | 12/1987 | Clement et al. |
| 4,730,684 A | 3/1988 | Pedersen |
| 4,813,906 A | 3/1989 | Matsuyama et al. |
| 4,898,256 A | 2/1990 | Lehner |
| 4,919,489 A | 4/1990 | Kopsco |
| 4,932,491 A | 6/1990 | Collins, Jr. |
| 4,932,831 A | 6/1990 | White et al. |
| 4,977,971 A | 12/1990 | Crane, III et al. |
| 4,993,912 A | 2/1991 | King et al. |
| 5,022,812 A | 6/1991 | Coughlan et al. |
| 5,123,495 A * | 6/1992 | Littlejohn et al. ............ 180/9.32 |
| 5,174,405 A | 12/1992 | Carra et al. |
| 5,197,558 A | 3/1993 | Misawa |
| 5,248,008 A | 9/1993 | Clar |
| 5,323,867 A | 6/1994 | Griffin et al. |
| 5,337,846 A | 8/1994 | Ogaki et al. |
| 5,429,543 A | 7/1995 | Tilbor et al. |
| 5,507,358 A | 4/1996 | Abe et al. |
| 5,513,716 A * | 5/1996 | Kumar et al. ................... 180/8.3 |
| 5,515,934 A | 5/1996 | Davis |
| 5,579,857 A | 12/1996 | Abe et al. |
| 5,742,975 A | 4/1998 | Knowlton et al. |
| 5,752,871 A | 5/1998 | Tsuzuki |
| 5,833,248 A | 11/1998 | Eguchi |
| 5,868,403 A | 2/1999 | Culp et al. |
| 5,884,718 A | 3/1999 | Yamashiro et al. |
| 6,046,565 A | 4/2000 | Thorne |
| 6,099,091 A | 8/2000 | Campbell |
| 6,144,180 A | 11/2000 | Chen et al. |
| 6,158,536 A | 12/2000 | Misawa |
| 6,267,196 B1 | 7/2001 | Wilcox et al. |
| 7,546,891 B2 * | 6/2009 | Won .............................. 180/9.32 |
| 7,874,386 B2 * | 1/2011 | Ben-Tzvi et al. ............... 180/9.1 |
| 8,074,752 B2 * | 12/2011 | Rudakevych ................ 180/9.32 |
| 8,122,982 B2 * | 2/2012 | Morey et al. ................. 180/9.32 |
| 2005/0148282 A1 * | 7/2005 | Moll et al. .................... 446/456 |
| 2007/0194540 A1 * | 8/2007 | Caspi et al. .................... 280/5.22 |
| 2008/0296853 A1 * | 12/2008 | Langford et al. ............ 280/5.22 |

FOREIGN PATENT DOCUMENTS

| | | |
|---|---|---|
| EP | 0206930 | 12/1986 |
| GB | 875 691 | 8/1961 |
| GB | 2280650 | 2/1995 |
| JP | 60176871 | 9/1985 |
| JP | 06-032263 | 2/1994 |
| JP | 8152916 A2 | 9/1996 |
| JP | 10250645 A * | 9/1998 |
| NL | 1002503 | 9/1996 |
| WO | WO 89/00928 | 9/1989 |

* cited by examiner

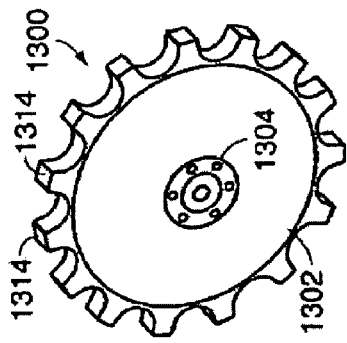
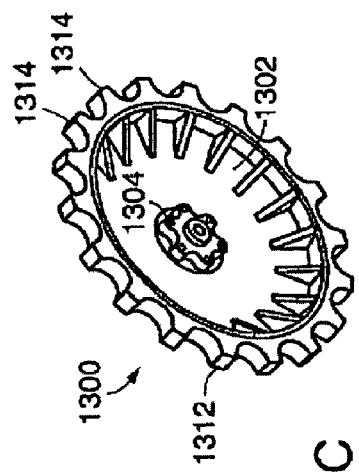
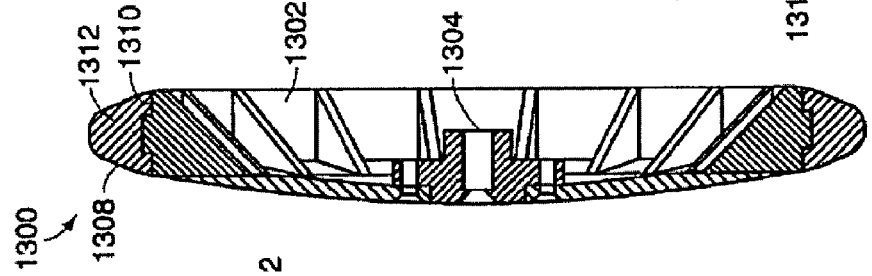
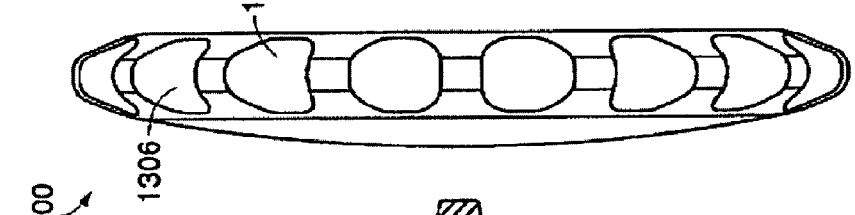
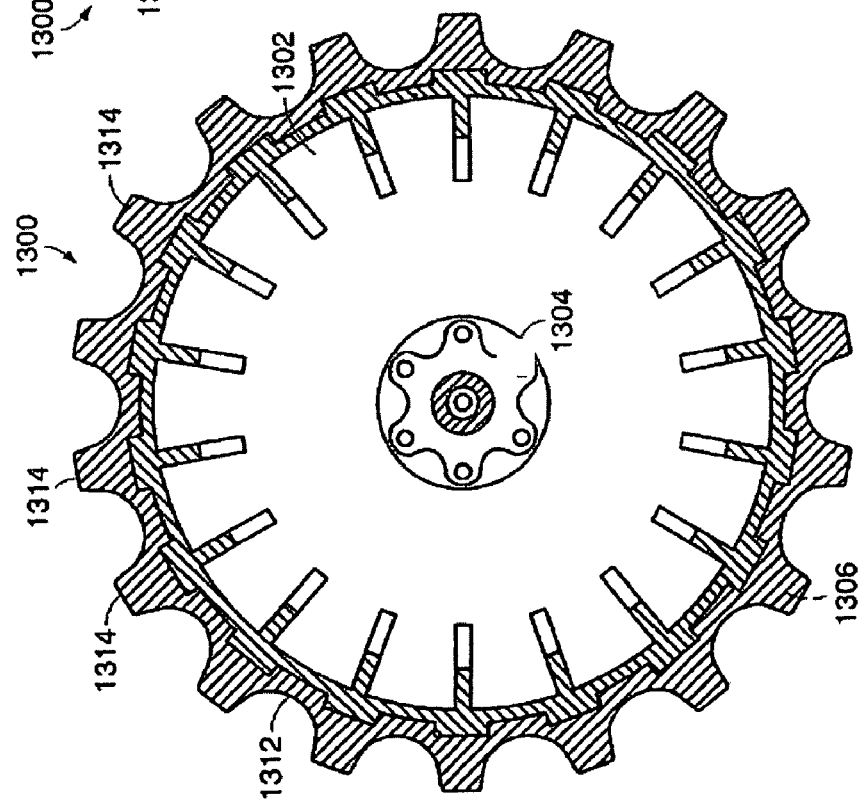

US 8,292,007 B2

WHEELED PLATFORMS

CROSS REFERENCE TO RELATED APPLICATIONS

This U.S. patent application is a continuation of, and claims priority under 35 U.S.C. §120 from U.S. patent application Ser. No. 12/023,561, filed on Jan. 31, 2008, which is a continuation of U.S. patent application Ser. No. 10/614,739, filed on Jul. 7, 2003 (now U.S. Pat. No. 7,363,994), which is a continuation of U.S. patent application Ser. No. 09/826,209, filed on Apr. 4, 2001 (now U.S. Pat. No. 6,662,889), which claims priority under 35 U.S.C. §119(e) to U.S. Provisional Application 60/194,922, filed on Apr. 4, 2000. The disclosures of these prior applications are considered part of the disclosure of this application and are hereby incorporated herein by reference in their entireties.

FIELD OF THE INVENTION

The present invention relates to wheeled platforms and wheeled vehicles in general, and in particular, relates to apparatus, configurations and methods for providing highly mobile wheeled platforms suitable for a variety of uses, including, but not limited to, robotic devices.

BACKGROUND OF THE INVENTION

The application of robotic devices and general-purpose transport platforms has enjoyed enormous growth in recent years, across all sectors of industrial, military and consumer/household operations, for a range of tasks limited only by the imagination of those employing such devices. These have included such disparate applications as surveillance, bomb disposal, industrial maintenance and household chores. In response to these demands, a number of configurations have been developed to provide enhanced-mobility vehicle structures that can be used in transport and robotic device applications over rough surfaces or terrain. Representative examples of such configurations are disclosed in the following U.S. patents:

U.S. Pat. No. 6,144,180
U.S. Pat. No. 5,833,248
U.S. Pat. No. 5,742,975
U.S. Pat. No. 5,579,857
U.S. Pat. No. 5,515,934
U.S. Pat. No. 5,507,358
U.S. Pat. No. 5,323,867
U.S. Pat. No. 4,993,912
U.S. Pat. No. 4,932,491

By way of example, U.S. Pat. No. 6,144,180 discloses a robot having a body, a pair of lift arms mounted pivotally on the body, a pair of leg support arms mounted pivotally on the lift arms, and a pair of wheeled leg assemblies mounted pivotally on each of the leg support arms. Each of the leg support arms is rotatable to turn one of the wheeled leg assemblies, which rests on the ground at the back of the other one of the wheeled leg assemblies, to a position in front of the other one of the wheeled leg assemblies, thereby moving forward the robot body. The lift arms can be rotated upward or downward relative to the leg support arms to lift or lower the robot body.

U.S. Pat. No. 5,833,248 purports to show a stairway ascending/descending vehicle that can ascend or descend stair-steps having a height greater than the diameter of the vehicle's wheels. The vehicle has mainshafts rotatably supported on a front portion and a rear portion of a vehicle body, respectively. Front arm members are mounted to the front mainshafts; rear arm members are mounted to the rear mainshaft; and the front and rear arm members are configured to rotate with respect to the mainshafts.

U.S. Pat. No. 5,742,975 discloses an articulated vehicle for scrubbing floor surfaces defined by intersecting aisles of relatively narrow width. The vehicle has articulated portions that facilitate turns in narrow aisles.

U.S. Pat. Nos. 5,579,857 and 5,507,358 disclose stair-climbing vehicles having a body, front and rear wheels provided at the front and rear of the vehicle body, respectively, front and rear auxiliary wheels for lifting the front and rear wheels, respectively, by one stair-step, a driving unit for driving each wheel, a pivoting unit for pivoting the front and rear auxiliary wheels, sensors for detecting a riser portion of stairs, and a control unit for controlling the driving unit and the rotating unit in accordance with outputs of the sensors. It is claimed that since the vehicle ascends/descends stairs by rotation of the auxiliary wheels, a corner portion of the step of stairs is not damaged while the vehicle goes up and down stairs.

U.S. Pat. No. 5,515,934 discloses a modular robot body assembly segmented into five modules, symmetrically located around a horizontal center shaft system, enabling the robot body, front legs, and back legs to rotate about a horizontal center axis with respect to one another.

U.S. Pat. No. 5,323,867 discloses a robot transport platform adapted for locomotion, having a base with three wheels on each side. The wheels near the fore and aft ends are omnidirectional in design, while the intermediate wheel (between the omnidirectional wheels) is a conventional wheel. The omnidirectional wheels have staggered rows of spherical rollers rotatably mounted to the circumference of the wheel's hub. Torque is provided by two electric motors independently operating the wheels on each side, and is transferred to the wheels via a gear box, a chain, and cogged drive belts.

U.S. Pat. No. 4,993,912 discloses a stair climbing robot having a chassis with powered, opposed front wheels and two pairs of rear wheels, each pair being rotatably mounted on a beam at opposite ends thereof, and each beam being rotatably mounted on the chassis. A drive motor is provided for driving each pair of wheels in the same direction at a predetermined rotational velocity; and a drive means is provided for simultaneously rotating the beams at a predetermined rotational velocity and in a predetermined direction. In operation, the beams rotate forward while each pair of rear wheels rotates in an opposite direction at the same rotational velocity. Forward movement is thus powered by the front wheels and rotating beams, while the rotational velocity of the rear wheels relative to the terrain is zero.

U.S. Pat. No. 4,932,491 describes a vehicle having auxiliary wheels that can be deployed to avoid overturning the vehicle when turning, traversing a slope, climbing an embankment or the like, and to right the vehicle when it is overturned.

Although the above-described devices represent advances over previous designs, wheeled platforms and devices such as those disclosed in the above-listed U.S. patents have notable limitations. They are typically inefficient, complex, cumbersome, heavy, and poorly suited to high-mobility operations on rough terrain or surfaces, such as traversing steep slopes, maneuvering around obstacles, and ascending or descending ramps or stairs.

Accordingly, there exists a need for wheeled platforms better suited to high-mobility, high-agility applications on rugged terrain and steep pitches. Ideally, such structures would be relatively robust, reliable, and conservative of battery or other energy sources, while providing enhanced abilities to traverse challenging terrain, and in some instances, to ascend or descend stairs and other obstacles. It is also desirable that such platforms be relatively compact, but scalable by selection of components and overall dimensions to adapt to various expected (and unexpected) terrain requirements.

SUMMARY OF THE INVENTION

The present invention provides wheeled platforms characterized by high mobility and reliability, which are readily used in a wide range of applications including transport and robotic devices. The wheeled platforms described herein can be operated on rough or steep terrain or surfaces; can ascend and descend conventional (and non-standard) stairs, whether indoors or outdoors; and can climb steep pitches smoothly. On stairs, the disclosed platforms can climb and descend with a minimum of step-induced dynamics, such as heave, pitch, and roll.

In addition, the disclosed platforms can turn-in-place (with a turning circle coextensive with the platform), are efficient, conservative of energy usage, and relatively simple in construction, and thus relatively inexpensive and lightweight.

The wheeled platforms described herein can be scaled (by component selection and overall dimension) so as to pass through standard doorways, crawl under standard furniture, and ensure low power consumption. In such embodiments, the wheeled platforms can include motive elements (whether electric, internal combustion or other) so that the platforms can propel themselves on level, uneven, or hilly ground, or over thresholds; and can maneuver on level terrain or on stairs, turning or changing direction as needed or directed.

A feature of the disclosed platforms is their ability to climb stairs with a rise per step on the same order of dimension as the diameter of a wheel element.

A number of overall configurations of wheeled platforms are disclosed herein. In a first configuration, a plurality of wheels are arrayed on either side of a body or base element, with wheel diameter and wheel spacing (or axle spacing) selected to enable the platform to traverse terrain elements, including stairs.

In another configuration, the wheeled platform is equipped with an articulated tail element that can be controlled to make selective contact with terrain.

In yet another configuration, the platform is articulated for relative movement of a first, forward body portion (referred to as a "flipper") and second, rearward body portion (referred to as a "base") about a substantially horizontal axis of rotation. The flipper can be controlled to make selective contact with terrain.

In each of these configurations, wheel spacing can be selected to provide fore/aft overlap of the wheel elements; selective rocker of the wheels can be provided to facilitate turning-in-place and efficient movement over level terrain; independent port and starboard drives can be provided to enable maneuvers, turns, or turns-in-place; and intermediate wheel elements (in plan view) can be mounted outwardmost, to enable turning-in-place in limited spaces. In addition, deeply studded or scalloped wheel elements can be employed at selected wheel locations, to facilitate gripping of stair-steps.

Thus, in one aspect, the invention can be embodied in a wheeled structure in which first and second sets of wheel elements are rotatably attached, respectively, to first and second portions of a platform or body, wherein a portion of at least one wheel element overlaps a portion of at least one other wheel element in the same set of wheel elements. This overlap (which in one embodiment can be termed "fore/aft overlap") can be further defined in that each wheel element has a defined radius (which need not be equal for all wheel elements), and a portion of at least one wheel element in a set of wheel elements overlaps another wheel element by a predetermined fraction of the radius of the other wheel element. In other words, the spacing between at least two wheel element axes will be less than the sum of the respective radii of the wheel elements. In an embodiment having equal-sized overlapping wheel elements (a constraint that is not required to practice the invention) the distance between the axes of one wheel element and another wheel element on the same side of the platform will be less than the diameter of the wheel elements. The wheeled structure thus defined can have 2, 3, 4, 5 or more axles, with 4, 6, 8 or more wheel elements (or even, in some embodiments, an odd number of wheel elements).

In another aspect of the invention, at least one of the intermediate wheel elements on each side of the wheeled structure (whether there are one or more intermediate wheels per side) are displaced outwardly from a longitudinal centerline of the body by an amount greater than that of any end wheel element. In other words, in plan view, the centermost wheel or wheels elements have a wider "track" than the end wheel elements—i.e., the port-side and starboard-side center wheels, in plan view, are displaced outwardly from the body, relative to other wheels in the respective first and second sets of wheel elements. This increases the stability of the wheeled platform, while enabling the platform to turn-in-place within a circle defined by the radii of the outer corners of the platform.

It will be noted that in the following detailed description and in the claims, the term "at least one intermediate wheel element" is used to denote one, two, three or more wheels per side (port and starboard or left and right) that are longitudinally between "outer" or "corner" wheel elements. Similarly, the outboard or corner wheel elements can number four or more. In an embodiment having four wheels, selected wheel elements can be arbitrarily designated as intermediate wheel elements. As the wheeled platform of the instant invention has no single direction of travel, the designations of left and right (in the viewer perspective) or port and starboard (in the coordinate system of the predominate direction of travel) are arbitrary and merely denote opposite sides of the body.

In one aspect of the invention, a selected degree of rocker is provided, such that the point of contact of the centermost wheel element on each side of the body can be lower than the respective point of contact of the end wheel elements. This facilitates the wheeled platform spinning or turning-in-place, thereby increasing agility. It will be understood by one of skill in the art that while in one embodiment, rocker of the wheel arrangement permits only one or two wheel-element pairs to contact a ground plane, in an alternate embodiment, the point of contact can be coplanar for all the wheels, depending on the weighting of the platform.

In another aspect of the invention, the body of the wheeled platform includes first and second body portions (which in one embodiment are fore and aft body portions), wherein the first body portion is connected to the second body portion via an articulation joint. The joint can be a hinge, pivot, or flexible body portion. The axis of articulation of the element can be substantially horizontal. The articulation element enables one of the body portions to act as a flipper having selective (and controllable) contact with the terrain, so as to increase the stability of the vehicle when traversing rugged terrain or climbing or descending stairs. In one embodiment, wheels are rotatably coupled to the flipper, and the flipper can provide support to the body (or other portion of the body) when traversing difficult or steep terrain or stairs. Angle control or motion control elements can be provided to control the angle of the flipper portion relative to the body (or other portion of the body).

In a further aspect of the invention, drive elements are provided to drive the wheel elements. In one embodiment, an independent drive element is arranged to drive at least one respective wheel element, and control elements are provided for controlling rotation of the respective wheel elements, to enable forward or reverse platform movement, turns or turns-in-place. In one embodiment, a first set of wheel elements is coupled to a port side of the body, a second set of wheel elements is coupled to a starboard side of the body, and independent port-side and starboard-side drive elements are provided to enable forward and rearward movement, turns or turns-in-place. In another aspect of the invention, the wheel elements in selected sets (or subsets) of wheel elements (e.g., left or right, port or starboard) can be geared or otherwise mechanically coupled so that the wheels in a wheel set turn in unison.

The wheel elements utilized in connection with the invention can include a tread portion; and in turn, the tread portion can be either smooth or patterned (e.g., with a studded or scalloped pattern). In other embodiments, wheel elements can be smooth or patterned with studded or scalloped patterns (without a distinct or separable tread portion). One such pattern thus consists of raised, spaced apart blocks. Another practice of the invention utilizes scalloped wheel elements at the corners of the platform (assuming more than 4 wheels) and smooth wheel elements for at least one of centermost wheel elements on each side. This facilitates turn-in-place, while maintaining the terrain-handling advantages (e.g., stair-climbing) afforded by scalloped wheel elements.

Finally, in the case of platforms useful in stair-climbing and descending, it has been found that the selection of wheel element diameter, axle count and axle spacing can and should be made in accordance with particular mathematical functions set forth hereinafter.

In alternative embodiments of the invention, fore/aft wheel element overlap is not utilized, but instead, wheel element diameter, wheel spacing, platform-to-wheel spatial displacement, and in one embodiment, flipper dimensions, are selected such that the platform is sufficiently high to avoid contact with obstacles or terrain elements, such as stairs. In particular, the wheels in this embodiment are disposed sufficiently close together (but without overlap) such that the vehicle can transverse stairs, rocks, thresholds or other obstacles (in some instances, by employing a flipper element), while maintaining the platform at a sufficient ground clearance to avoid ground/obstacle contact.

Additional features of the invention, its nature and various advantages are shown and described in the accompanying drawings and written description. The written description and attached drawing figures present the invention at various levels of enabling detail, from conceptual to specific examples of implementation. It will be appreciated by those skilled in the art that the present invention may be practiced in connection with details that differ from the specific examples of implementation set forth herein. By way of example, those skilled in the art will appreciate that the methods, systems and devices described herein can be implemented in devices, systems and methods differing from those depicted or described herein, and that the examples set forth herein are provided by way of illustration rather than limitation. In other instances, conventional or otherwise well-known structures and devices are described by way of reference to known or conventional engineering terminology.

BRIEF DESCRIPTION OF THE DRAWINGS

Various aspects and embodiments of the present invention are set forth in the attached drawing figures, in which:

FIGS. 13A, B, C, D and E are outside, edge-on and perspective views, respectively, of one embodiment of a wheel element suitable for use in wheeled platforms according to the invention.

DESCRIPTION OF ILLUSTRATED EMBODIMENTS

Overview

Figure 1A:
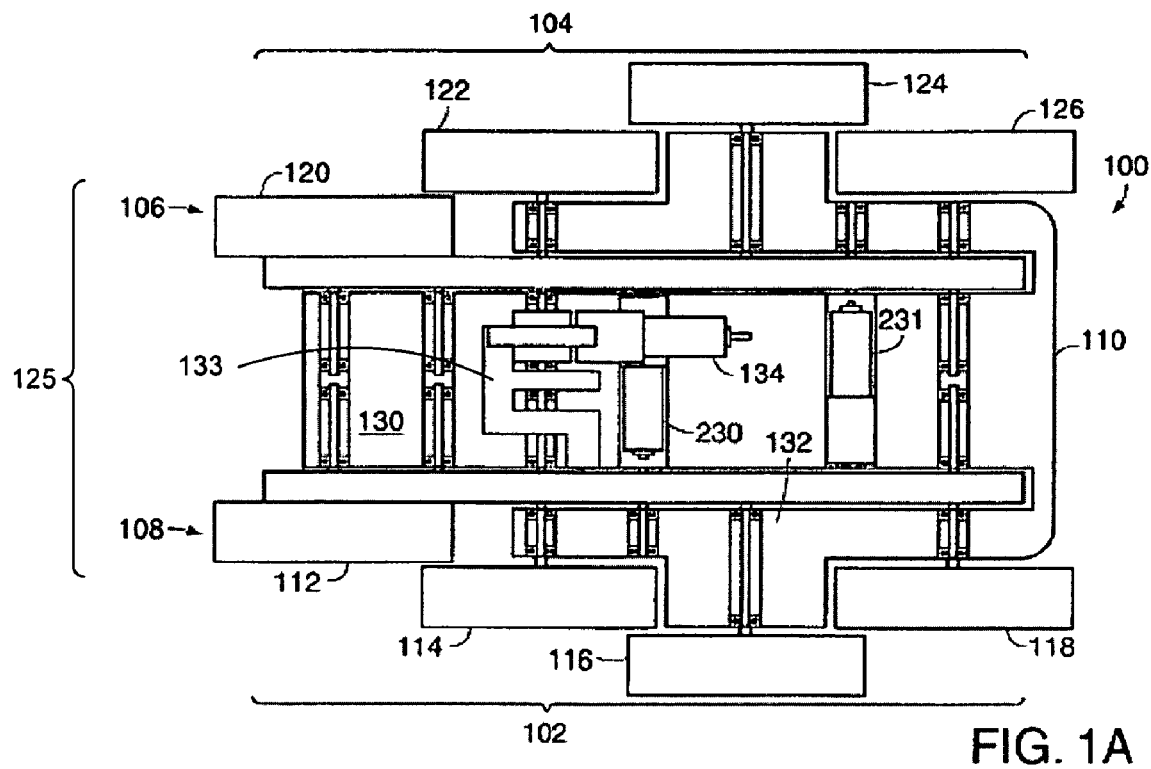
FIG. 1A is a plan view of one configuration of wheeled platform in accordance with the invention.

The present invention, various embodiments of which are depicted in the attached drawing figures, provides highly agile wheeled platforms that can be used in various transport and robotic applications and operated on rough or steep terrain or surfaces. The disclosed platforms can be scaled, by component selection and overall dimension, so as to pass through standard doorways, crawl under standard furniture, and ensure low power consumption. The platforms can include motive elements (whether electric, internal combustion or other) so that the platforms can propel themselves on level, uneven, or hilly ground, or over thresholds; maneuver on level terrain or on stairs, turning or changing direction as needed or directed; and spin or turn-in-place, with a turning circle substantially coextensive with the radius of the platform.

A number of overall configurations of wheeled platforms are disclosed herein. In a first configuration, referred to as the "flipper" embodiments, a plurality of wheels are arrayed on either side (e.g., left/right, port/starboard) of a body or chassis element, and the body or chassis is articulated to permit controlled, relative movement of a first body portion relative to a second body portion about a first axis of rotation. In one embodiment, the first body portion is referred to as a flipper and the second body portion referred to as a "base"; and the first axis of rotation is substantially perpendicular to a longitudinal (or fore/aft) axis of the platform. This substantially perpendicular axis of rotation may be substantially horizontal, and the rotation or vertical movement of the flipper about that axis can be controlled by a motor or the like, so that the flipper can make selective contact with terrain and/or to control pitch, heave and other motions of the base portion.

In another configuration, referred to herein as the "tail" embodiments, the wheeled platform is equipped with an articulated tail element that can be controlled to make selective contact with terrain. In the flipper and tail configurations, the wheel elements can be disposed about the platform such with selected fore-aft overlap between adjacent wheel elements, and such that intermediate wheel elements on each side are displaced outward from a fore/aft axis of the platform, so as to present a wider track at the fore/aft centerline, thus increasing stability while maintaining the ability of the platform to turn-in-place within a small circle. In each of these configurations, wheel diameter, wheel (or axle) spacing and other parameters can be selected to provide, where desirable, fore/aft overlap of the wheel elements. In addition, selective rocker of the wheels can be provided to facilitate turning-in-place and efficient movement over level terrain. Independent port and starboard drives can be provided to enable maneuvers, turns, or turns-in-place; and intermediate wheel elements (in plan view) can be mounted outwardmost, to enable turning-in-place in limited spaces. In addition, deeply studded or scalloped wheel elements can be employed at selected wheel locations, to facilitate gripping of stair-steps.

In yet another embodiment, the wheels elements are not overlapping, but wheel diameter and wheel spacing (or axle spacing) are selected to enable the platform to traverse terrain elements, such as stairs and the like, with or without the use of a flipper portion.

Finally, discussion will be provided of selection criteria and stair climbing/descending.

Flipper Embodiment

Figure 1B:
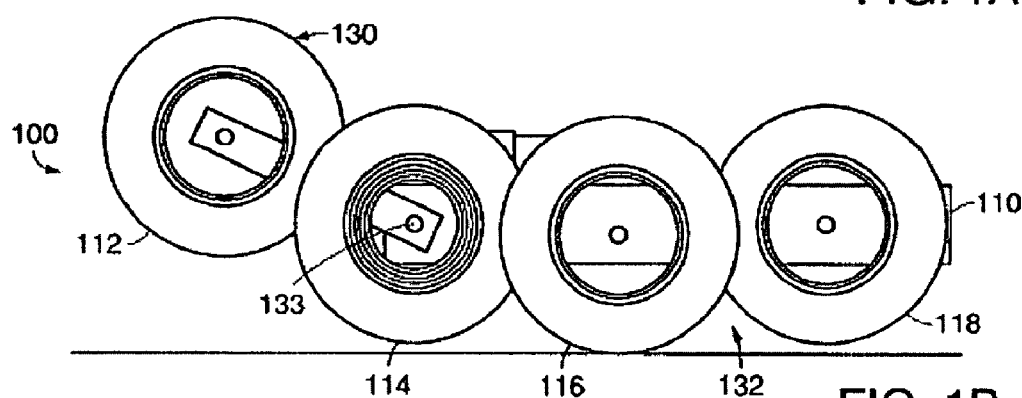
FIG. 1B is a side view of the wheeled platform of FIG. 1A, showing a first, "flipper" portion of the platform elevated off the ground plane.
Figure 1C:
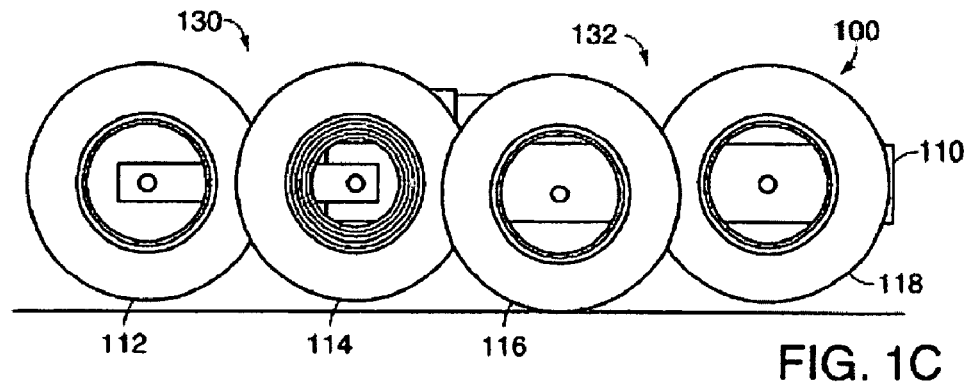
FIG. 1C is another side view of the wheeled platform of FIG. 1A, in which the flipper portion has been lowered to make contact with the ground plane.
Figure 2:
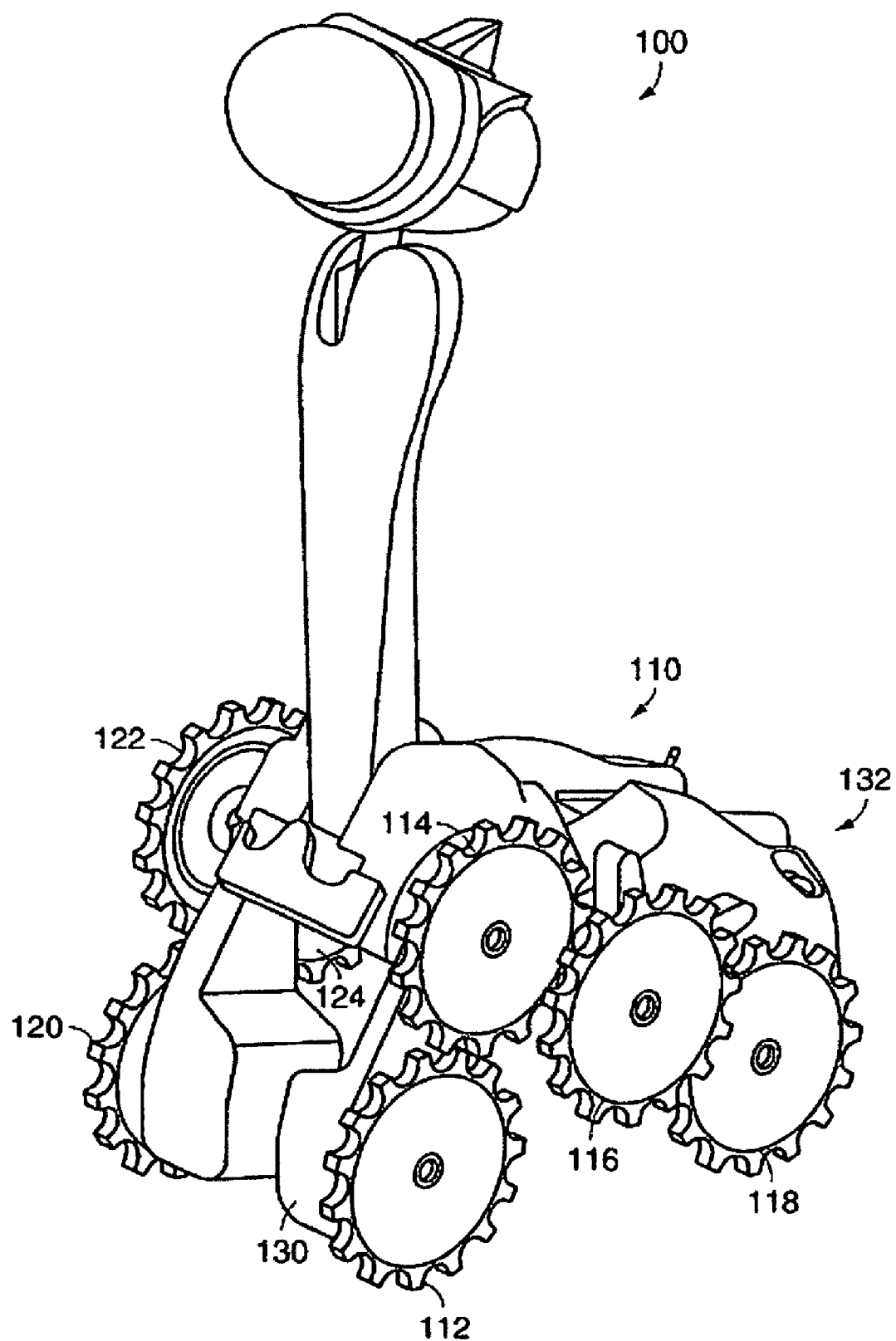
FIG. 2 is a front three-quarter view of a robotic device employing a wheeled platform constructed in accordance with the invention.

As depicted in FIGS. 1A, 1B, and 1C, one embodiment of the invention is a wheeled platform 100 in which first and second sets 102, 104 of wheel elements are rotatably attached, respectively, to first and second sides 106, 108 (in this case, left and right, or port and starboard sides) of a body or chassis 110, wherein a portion of at least one wheel element 112 overlaps a portion of at least one other wheel element 114 in the same set of wheel elements 102, 104 with the flipper portion 125 in the forward position (see FIG. 1C).

Thus, for example, in the first or port set 102 of wheel elements 112, 114, 116, 1118, wheel element 114 overlaps wheel element 112; wheel element 116 overlaps wheel element 114; and wheel element 116 overlaps wheel element 118 with the flipper portion 125 in the forward position (see FIG. 1C; see FIG. 1A). Similarly, in the second or starboard set 104 of wheel elements 120, 122, 124, 126, wheel element 122 overlaps wheel element 120; wheel element 124 overlaps wheel element 122; and wheel element 124 overlaps wheel element 126 (see FIG. 1C; see also FIG. 1A).

The platform 100 depicted in FIGS. 1A, 1B, and 1C is advantageously employed in the iRobot commercially available from iRobot Corporation of Somerville, Mass., various aspects of which, including first and second sets of wheel elements 102, 104, and wheel elements 112, 114, 116, 118, 120, 122, 124, and 126, are depicted in FIGS. 2-7. However, it will be understood that the structures described herein can be employed in a wide range of other transport and robotic applications.

Referring now to FIGS. 1-7, the overlap between adjacent wheels (which in one embodiment can be termed "fore/aft overlap") can be further defined in that each wheel element has a defined radius (which need not be equal for all wheel elements), and a portion of at least one wheel element in a set of wheel elements overlaps another wheel element by a predetermined fraction of the radius of the other wheel element. In other words, the spacing between at least two wheel element axes will be less than the sum of the respective radii of the wheel elements. In an embodiment having equal-sized wheel elements (a constraint that is not required to practice the invention) the distance between the axes of one wheel element and another wheel element on the same side of the platform will be less than the diameter of the wheel elements.

It will be understood that the elements used to rotatably attach the wheel elements to the body portions, which may include axles, pins, bearings, hubs and the like, may be conventional in nature, and the individual selection of particular coupling elements is within the ability of those skilled in the art.

The wheeled platform 100 thus defined can have 2, 3, 4, 5 or more "axles", with 4, 6, 8 or more wheel elements (or even, in some embodiments, an odd number of wheel elements). The term "axle", as used herein, is not limited to a physical axle passing through opposite right and left wheels, but in preferred embodiments can include an axis of rotation of individual wheel elements, which, in some embodiments having port/starboard symmetry, will be common to opposite left and right wheels. It will be understood, however, that the invention can be embodied in nonsymmetrical forms, in which there will not be a common "axle" passing through both left and right wheels.

Referring again to FIGS. 1-7, it will be seen that the body 110 of the wheeled platform 100 includes fore and aft body portions 130, 132, and the fore portion is connected to the aft portion via an articulation element 133. This element can be a hinge, pivot, or flexible body portion. The axis of articulation of the element can be substantially perpendicular to a longitudinal axis of the platform, such that the axis of articulation is substantially horizontal. Articulation can also be provided in a transverse direction (i.e., with an axis of rotation about an axis substantially parallel to a longitudinal axis of the platform). The articulation element thus enables the fore portion to act as a "flipper" having selective (and controllable) contact with the terrain, so as to increase the stability of the vehicle when traversing rugged terrain or climbing or descending stairs.

Thus, the illustrated embodiment is an articulated, wheeled platform, in which the articulation can be a substantially horizontal hinge forward of a fore/aft center of the platform.

A total of eight wheels are arrayed substantially symmetrically about the plan-view centerline, and the centerline of articulation corresponds substantially to the second axle line, which is defined in this embodiment by the "axle" coupled to wheel elements 114, 122.

Moreover, in the embodiment depicted in FIGS. 1-7, wheels 112 and 120 are rotatably coupled to the flipper, and the flipper can provide support to the body (or other portion of the body) when traversing difficult or steep terrain or stairs. Examples of the use of the articulating body portions are shown in FIGS. 12B and 14-15C. Conventional angle control or motion control elements, such as electric motors, can be provided to control the angle of the flipper portion relative to the body as discussed in greater detail below.

Figure 3:
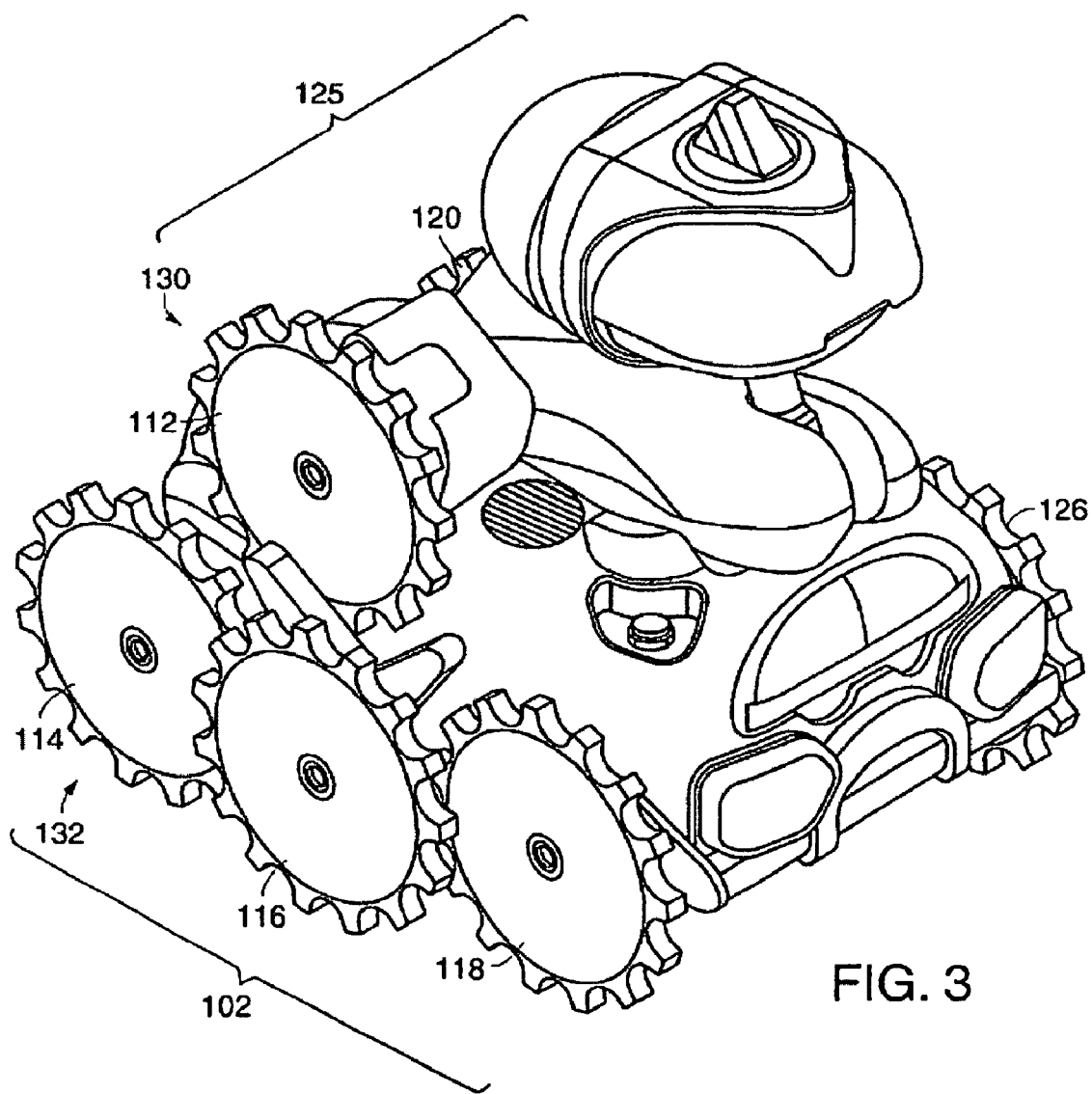
FIG. 3 is a three-quarter view of the robotic device of FIG. 2, showing further detail of the wheeled platform constructed in accordance with the invention.
Figure 4:
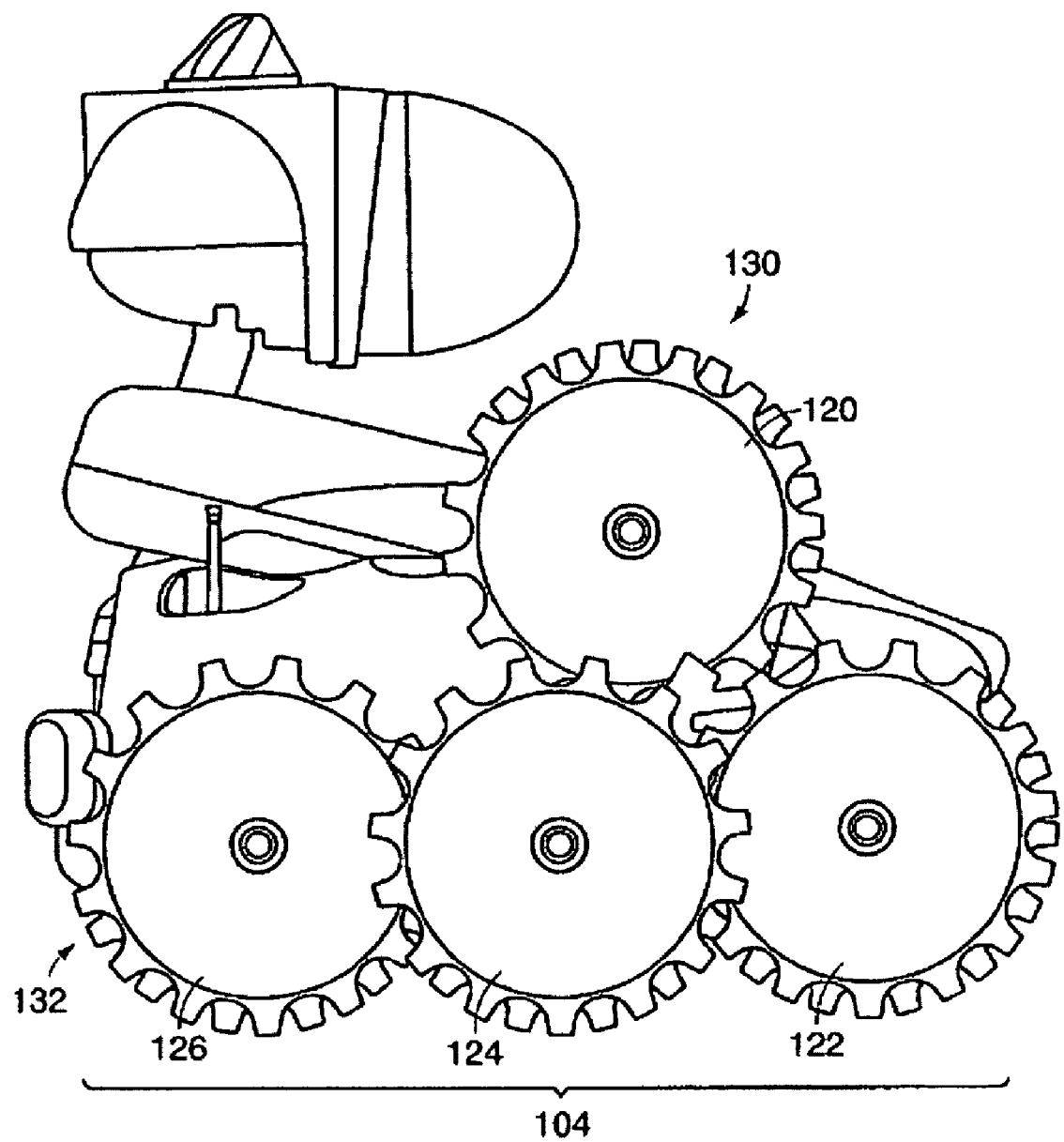
FIG. 4 is a side view of the robotic device of FIG. 2.
Figure 5:
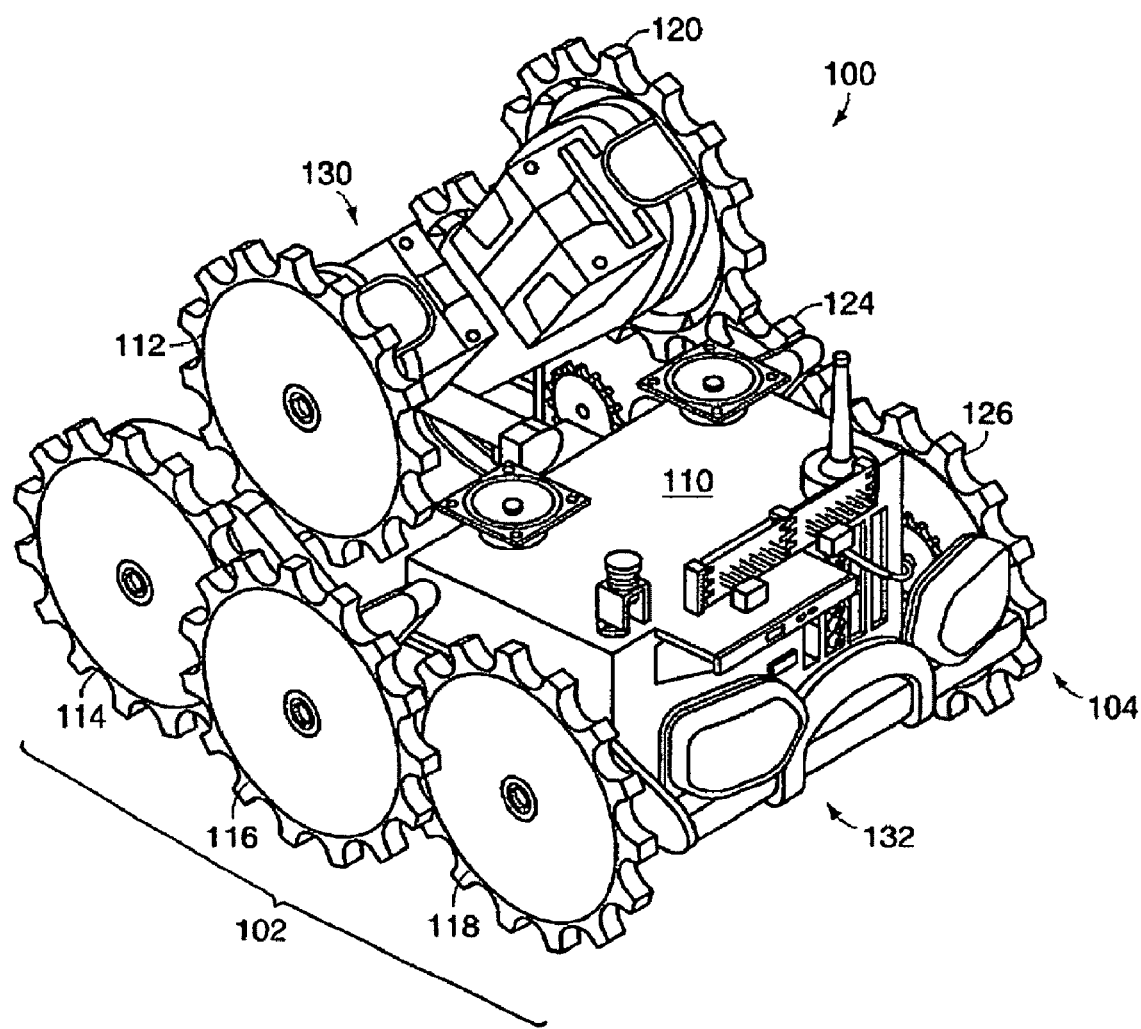
FIG. 5 is an isometric view of the wheeled platform utilized in the robotic device of FIG. 2.
Figure 6:
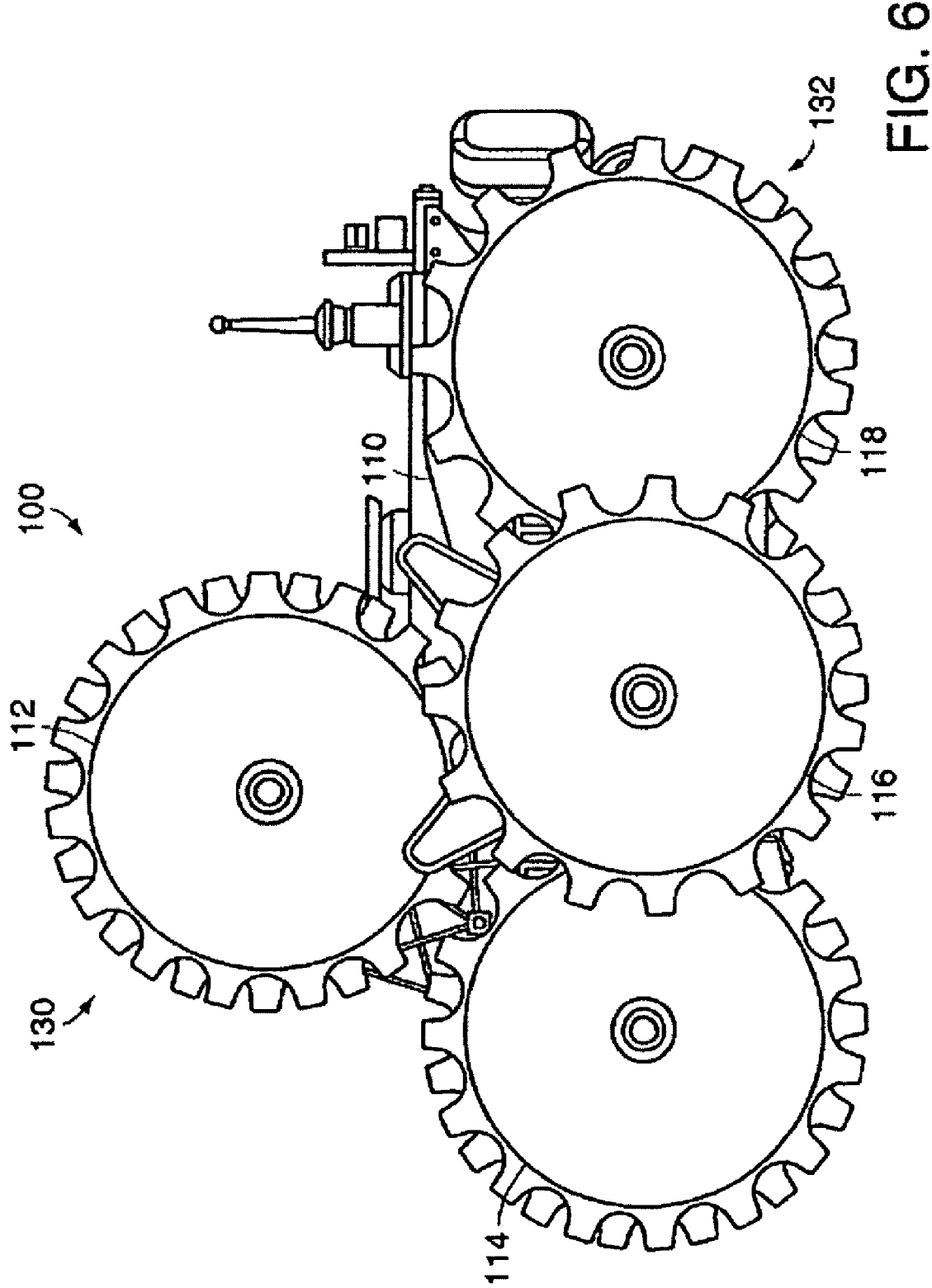
FIG. 6 is a side view of the wheeled platform utilized in the robotic device of FIG. 2.
Figure 7:
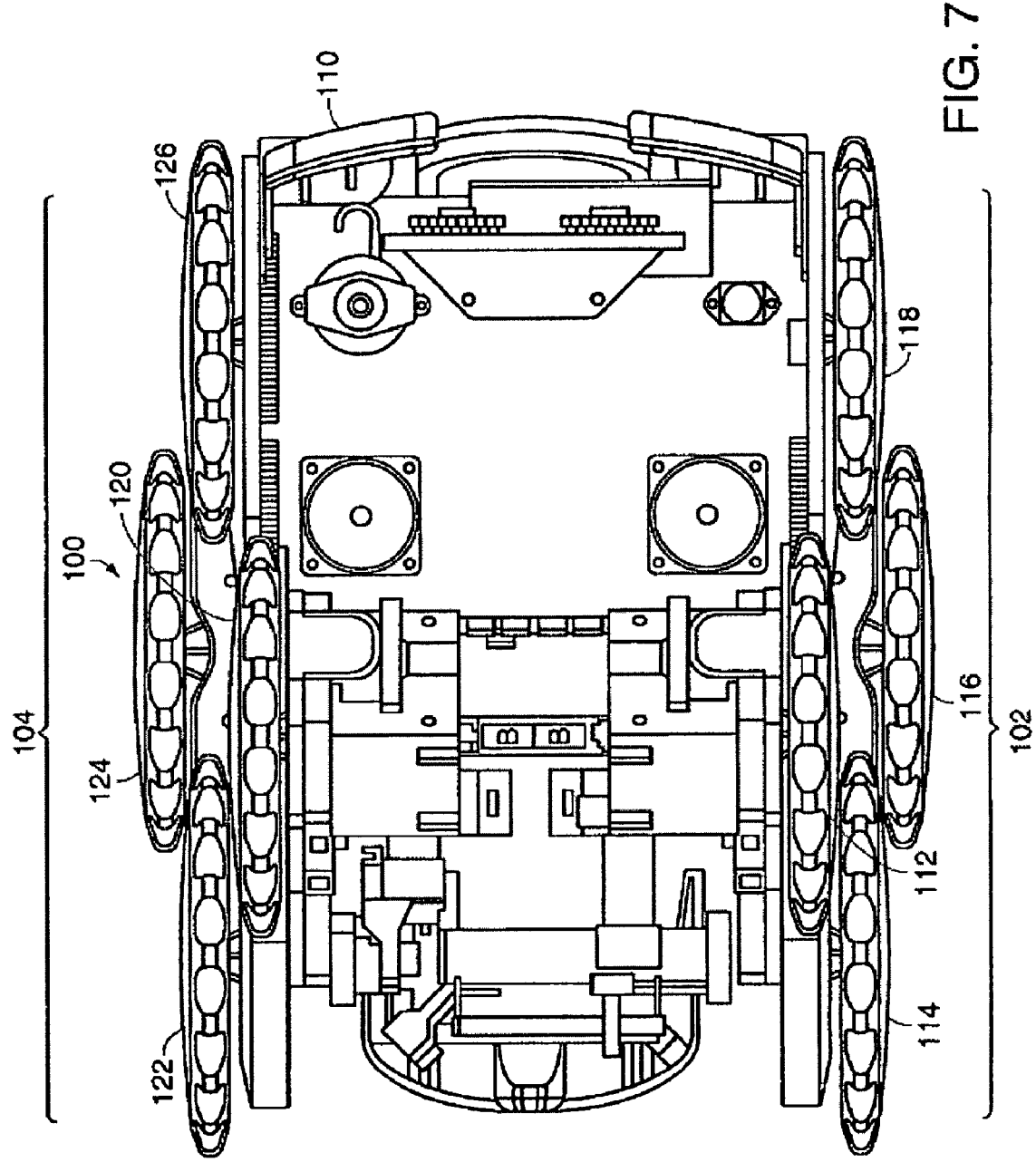
FIG. 7 is a plan view of the wheeled platform utilized in the robotic device of FIG. 2.
Figure 8:
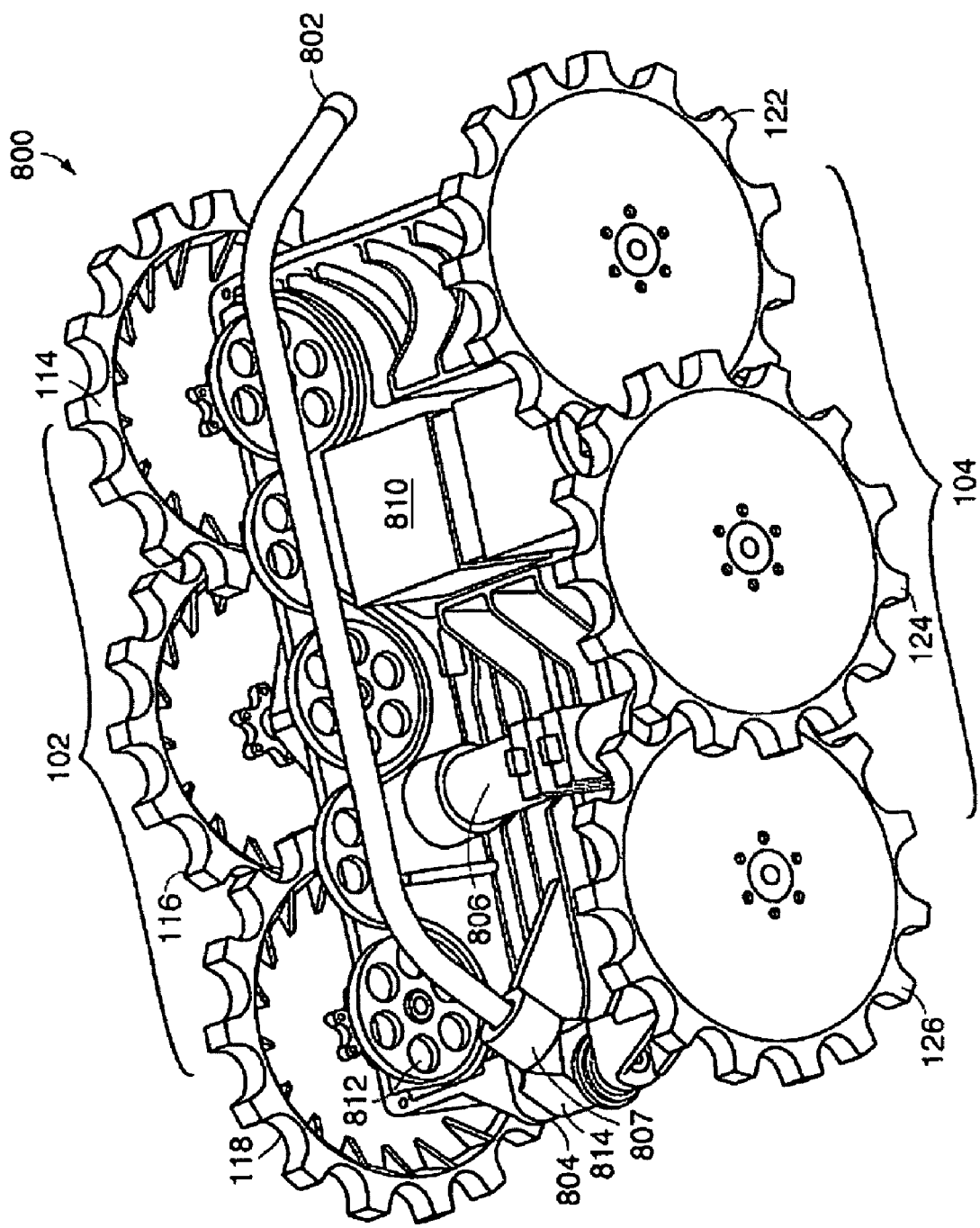
FIG. 8 is a perspective view of another embodiment of a wheeled platform according to the invention, with a "tail" element in a retracted position.

In certain embodiments, the flipper is designed as to provide for increased stability at various angles of deployment. In FIG. 3, for example, with the flipper 125 in a stowed position, the center of gravity of the entire device preferably should be placed as close as possible over the center of wheel elements 116, 124. Such a configuration minimizes the energy needed to propel the wheeled platform. Likewise, the flipper 125 should be weighted such that when the flipper 125 is deployed in a forward position (see FIG. 1C), the center of gravity is moved substantially forward. This allows for greater stability over certain terrain, such as stairs and the like. In a preferred embodiment, the batteries for the wheeled platform are arranged in the flipper 125 to allow for this movement of the center of gravity. One of skill in the art will recognize that the need to control the center of gravity may or may not be necessary, depending on the size of the wheels and the expected use of the platform.

Increased Track of Intermediate Wheel Elements; Rocker:

Also as most clearly shown in FIGS. 1A, 3, 5 and 7, in this embodiment of the invention, at least one of the intermediate wheel elements on each side of the wheeled structure (whether there are one or more intermediate wheels per side) are displaced outwardly from a longitudinal centerline of the body by an amount greater than that of any end wheel element. In other words, in plan view, the centermost wheel or wheels elements have a wider "track" than the end wheel elements, and the port-side and starboard-side intermediate wheels, in plan view, are displaced outwardly from the body, relative to other wheels in the respective first and second sets of wheel elements. This increases the stability of the wheeled platform, while enabling the platform to turn-in-place within a circle defined by the radii of the outer corners of the platform.

It will be noted that in the following detailed description and in the claims, the term "at least one intermediate wheel element" is used to denote one, two, three or more wheels per side (port and starboard or left and right) that are longitudinally between "outer" or "corner", wheel elements. Similarly, the outboard or corner wheel elements can number four or more. In an embodiment having four wheels, selected wheel elements can be arbitrarily designated as intermediate wheel elements.

Also as most clearly depicted in FIGS. 1B and 1C, a selected degree of rocker is provided, such that the point of contact of at least one intermediate wheel element on each side (in FIGS. 1A, 1B and 1C, the center wheel in each set of three wheels on the base portion of the platform) can be lower than the respective point of contact of the end wheel elements. This reduces frictional losses when the platform is traversing smooth terrain and surfaces, and facilitates spinning or turning-in-place, thereby increasing agility of the platform.

Drive Elements:

In a further aspect of the embodiment shown in FIGS. 1A, 1B and 1C, drive elements are provided to drive the wheel elements and to drive the flipper element. In one embodiment, an independent drive element is arranged to drive at least one respective wheel element, and control elements are provided for controlling rotation of the respective wheel elements, to enable forward or reverse platform movement, turns or turns-in-place. Thus, a first set of wheel elements is coupled to a port side of the body, a second set of wheel elements is coupled to a starboard side of the body, and independent port-side and starboard-side drive elements are provided to enable forward and rearward movement, turns or turns-in-place. The wheel elements in selected sets (or subsets) of wheel elements (e.g., left or right, port or starboard) can be geared or otherwise mechanically coupled so that the wheels in a wheel set turn in unison.

More particularly, as shown in FIG. 1A, drive module 230 is coupled to the first set of wheels 102; drive module 231 is coupled to the second set of wheels 104; and drive module 134 is coupled to the flipper portion 125, to raise and lower the flipper portion 125 as required. Each module 230, 231, 134 includes a drive motor or element and a corresponding control element.

It will be understood that conventional power transmission elements, such as shafts, couplings, gears, pulleys, belts, chains, clutches and the like, can be used as required in the illustrated embodiments, and the individual selection of particular drive elements is within the ability of those skilled in the art.

It will also be recognized that there are various choices for activating the propulsion and the articulation features of the disclosed platforms. The illustrated platforms have three degrees of freedom, including port-side propulsion; starboard-side propulsion; and articulation; and they are conveniently activated by using three independent motors.

Moreover, in the illustrated embodiments (see, e.g., FIG. 1A), one drive module 230 drives all port-side wheels 102 through a reduction gearbox and a spur-gear train; a second drive module 231 drives all starboard-side wheels 104 through a second reduction gearbox and spur-gear train; and a third drive module 134 drives the articulation element 133 through a reduction gearbox and a worm-and-worm wheel train. In the wheeled-flipper embodiment, the articulation axis is coincident with a wheel-and-spur gear axis (but this is not necessary to practice the invention), so that the spur gear train can bridge the articulation axis without any complication beyond an inconsequential interaction between actuation of the articulation element 133 and limited rotation of the flipper-mounted wheels 112, 120 with respect to the base-mounted wheels 114, 116, 118, 122, 124, 126.

Finally, it will be recognized that numerous variations of the disclosed structures and drive elements are possible, including, but not limited to the use of three motors with different reduction and transmission arrangements, such as jackshafts and universal joints replacing the spur gear trains of the illustrated embodiments; helical gears instead of spur gears in the gear trains; or any combination or hybrid of the above. Also possible is the use of a motor, with or without reduction, for each wheel, as well as for the articulation action; a single motor and two clutches, with or without reduction; or two motors and one clutch, with or without reduction.

"Tail" Embodiment

Figure 9:
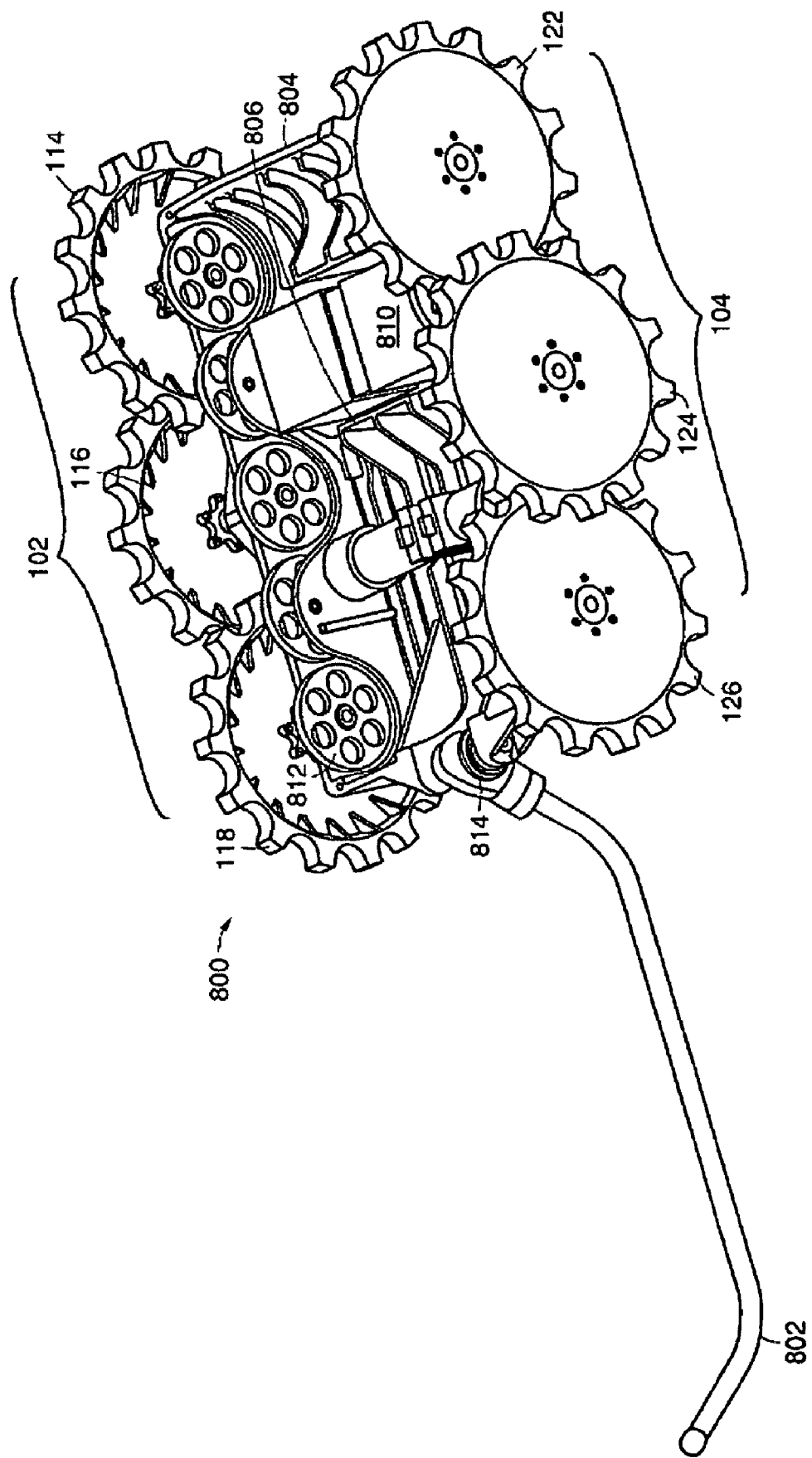
FIG. 9 is a perspective view of the wheeled platform of FIG. 8, with the tail element in an extended position.
Figure 10A:
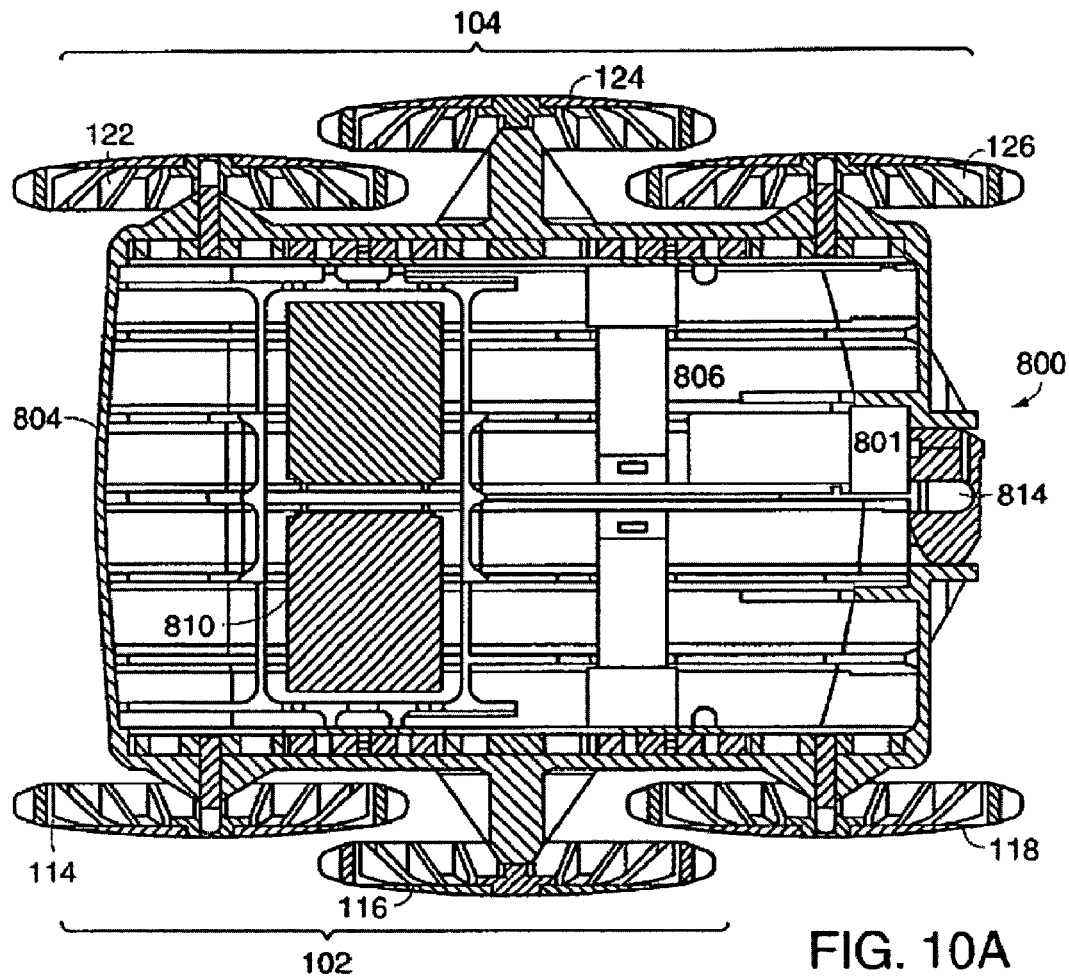
FIG. 10A is a bottom view of the wheeled platform of FIG. 8.
Figure 10B:
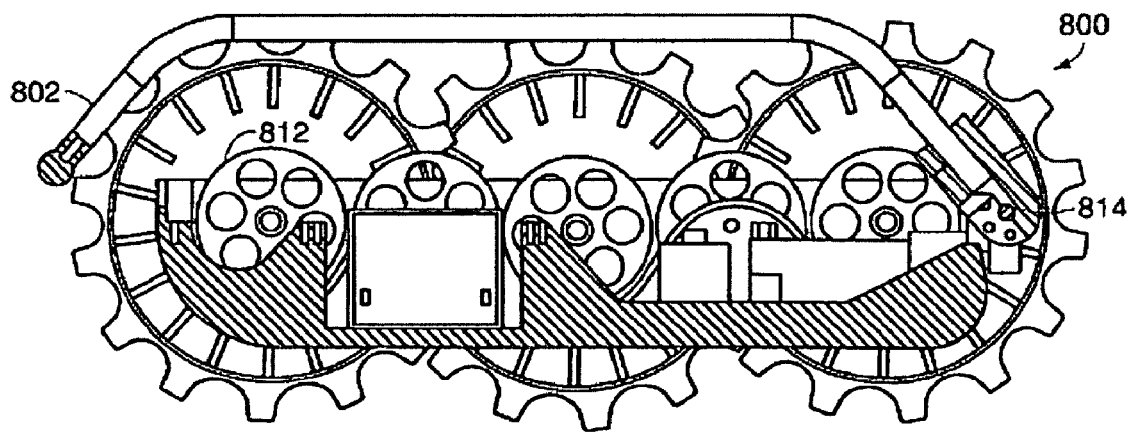
FIG. 10B is a side view of the wheeled platform of FIG. 8, showing detail of the drive elements.
Figure 11A:
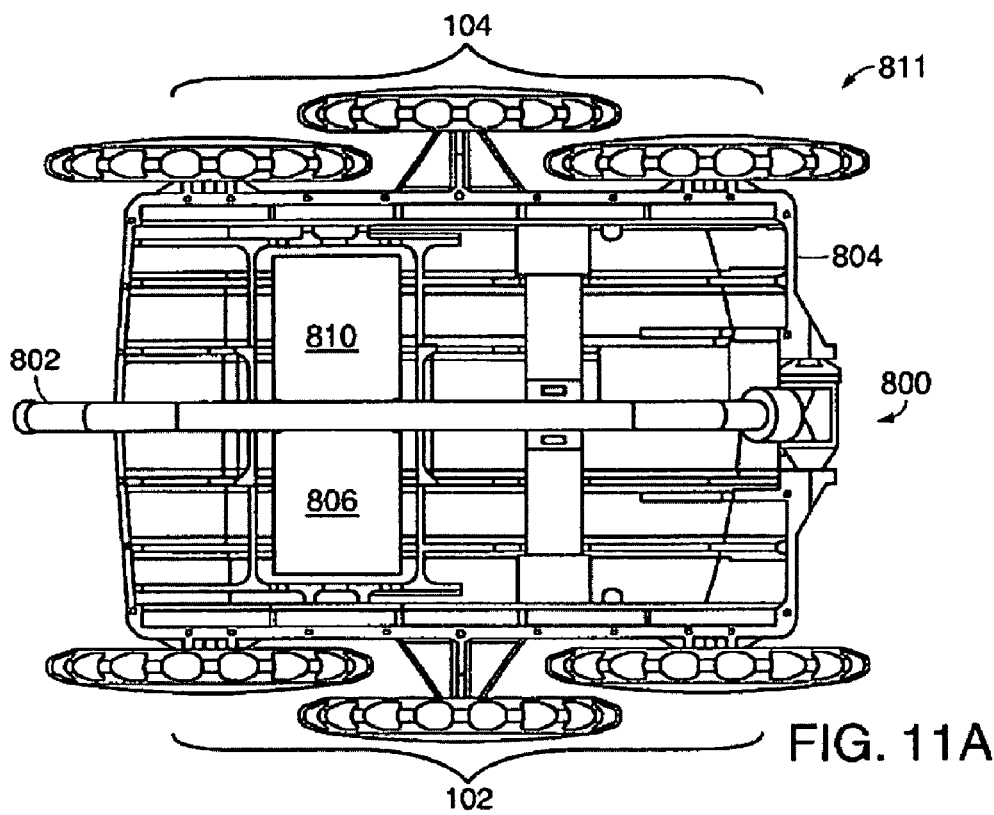
FIG. 11A is a top view of the wheeled platform of FIG. 8, showing the tail element in a retracted position.
Figure 11B:
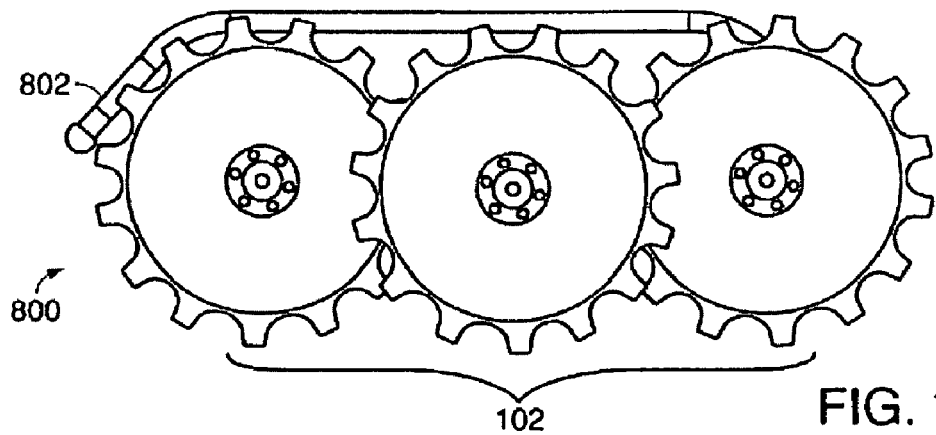
FIG. 11B is another side view of the wheeled platform of FIG. 8.
Figure 11C:
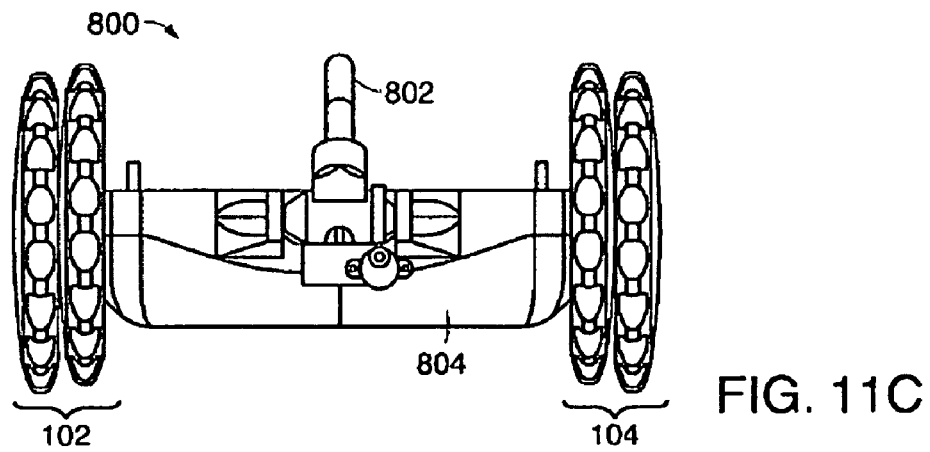
FIG. 11C is a rear view of the wheeled platform of FIG. 8.

In another embodiment of the invention, depicted in FIGS. 8, 9, 10, and 11, the wheeled platform 800 is equipped with an articulated "tail" element 802, pivotally coupled to a body portion 804, that can be controlled to make selective contact with terrain. In a manner somewhat analogous to the flipper portion of the embodiment shown in FIGS. 1-7, the tail element 802 can provide support to the body portion 804 when the platform 800 is traversing difficult or steep terrain or stairs. Thus, while in FIG. 8, the tail element is retracted, FIG. 9 depicts the tail element 802 in an extended position to make selective contact with terrain or surfaces. One of skill in the art will recognize that the embodiments comprising a flipper and embodiments comprising a tail are not mutually exclusive.

Like the embodiment shown in FIGS. 1-7, platform 800 includes first and second sets (102, 104) of wheel elements that are rotatably attached, respectively, to port and starboard sides of body portion 804, such that the corner wheel elements overlap the intermediate wheel element in each set of wheel elements. In addition, the intermediate wheel element on each side is displaced outwardly from a centerline of the body portion 804. In this way, the intermediate wheel elements are wider apart than the corner wheel elements, and thus present a wider track. This aspect is similar to that shown in plan view in FIG. 1A.

It will be understood that, among other things, fewer or more than 6 wheels can be utilized, that the wheels may be spaced apart in a non-overlapping fashion, and that the wheels on each side may be disposed all in a row, rather than offset (i.e., with the intermediate wheels wider apart than the corner wheels).

In the illustrated embodiment, the body portion 804 can accommodate drive modules 806, 810 (which may include conventional batteries, electric motors, or the like) and transmission elements 812 (which may include conventional gears, pulleys, belts, chains or the like). The tail element 802 can be pivotally coupled to the body portion 804 via a conventional articulation element 814, which can be a conventional pivot, hinge or the like. The angle and position of the tail element 802 relative to the body portion 804 can be controlled by a conventional, dedicated motion control or drive element 807 (which can be an electric motor or the like). Alternatively, the tail element 802 can be driven by a power take-off from one of the drive modules 806, 810 used to propel the platform 800. Power is provided by a battery included in one or the drive modules 806, 810.

Thus, the illustrated embodiment replaces the wheeled flipper of FIGS. 1-7 with an articulated tail in the base's vertical fore-and-aft center plane. In the example shown, this configuration has six (6) wheels arrayed in a formation like that of the base of the first design configuration. The curved tail lying in the fore-and-aft vertical center plane of the vehicle, and articulated about a laterally-disposed horizontal axis that is typically at about or just aft the aft-most axle of the vehicle, is long enough to contact a step forward of the first axle of the vehicle, when the tail itself is articulated furthest forward with respect to the base. The articulated curved tail can be under independent control, like the flipper of the first configuration. It may be used to contact the first step of a stairway and lift the first axle of the six-wheel three-axle base, off the ground or landing, and allowing it to attain the first step. Subsequently, the curved articulated tail may be swung all the way aft to contact the stairs aft the vehicle, to enhance the vehicle's stability or orientation on the stairs. In a preferred embodiment, the tail 802 in its fully deployed aft position should remain at all times above the plane defined by the wheel elements to avoid interference with stairclimbing. While an articulated tail in the described center plane may be a preferred embodiment, this embodiment of the invention can be configured with the articulated tail in other planes or articulated about even skewed axes.

Non-Overlapping Wheels Embodiment

Figure 12A:
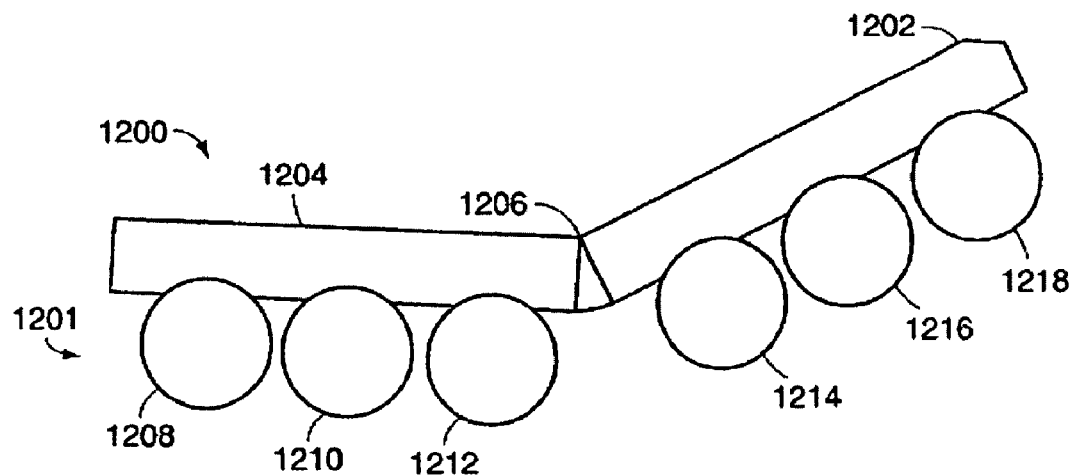
FIG. 12A is a side view of another embodiment of a wheeled platform in accordance with the invention.
Figure 12B:
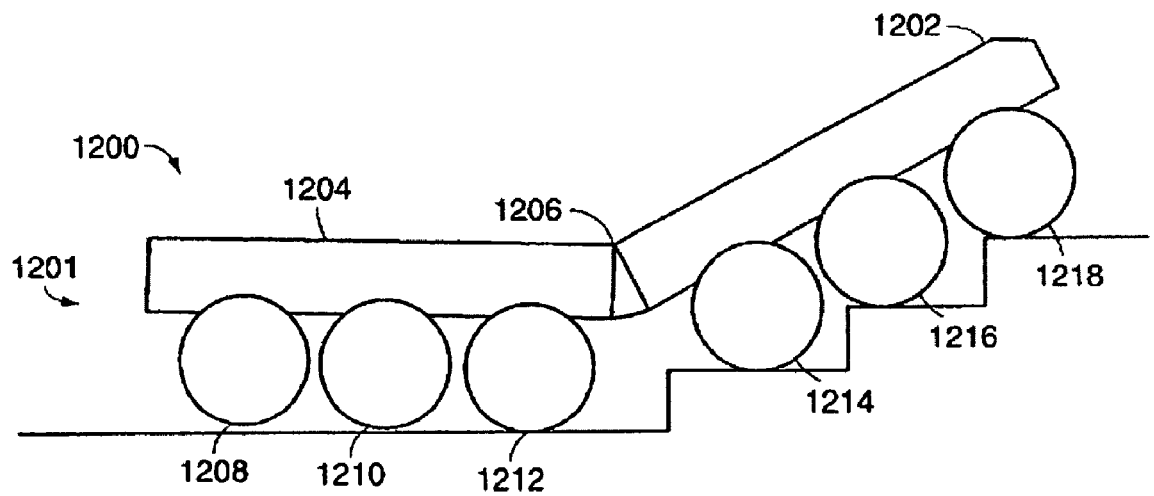
FIG. 12B is a side view of the wheeled platform of FIG. 12A ascending or descending stairs.

FIGS. 12A, 12B: In alternative embodiments of the invention, fore/aft wheel element overlap is not utilized, but instead, wheel element diameter, wheel spacing, platform-to-wheel spatial displacement, and in one embodiment, flipper dimensions, are selected such that the platform is sufficiently high to avoid contact with obstacles or terrain elements, such as stairs. In particular, the wheels in this embodiment are disposed sufficiently close together (but without overlap) such that the vehicle can transverse stairs, rocks, thresholds or other obstacles (in some instances, by employing a flipper element), while maintaining the platform at a sufficient ground clearance to avoid ground/obstacle contact.

Thus, for example, FIGS. 12A and 12B are schematic side views of a wheeled platform 1200 in which the wheel elements are closely spaced, but without overlap. For purposes of simplicity, the present discussion and FIGS. 12A and 12B refer focus on one side (for example, the port side) 1201 of platform 1200. It will be understood, however, that the wheel elements and drive mechanisms depicted in FIGS. 12A and 12B can be duplicated, identically or non-identically, symmetrically or asymmetrically, on at least one other side (for example, the starboard side) of the wheeled platform 1200.

As shown in FIGS. 12A and 12B, the wheeled platform 1200 includes body or chassis portions 1202, 1204 coupled together by at least one articulation element 1206, which may be a conventional hinge, pivot, or flexible portion, having an axis of rotation substantially perpendicular to a longitudinal axis of the wheeled platform 1200. In the illustrated embodiment, wheels 1208, 1210, 1212 are rotatably coupled to one side 1201 (for example, the port side) of body portion 1204 by conventional elements (not shown), which may be like those discussed elsewhere in this document with respect to other embodiments of the invention. In turn, wheels 1214, 1216, 1218 are rotatably coupled to the one side 1201 of the body portion 1202.

In the example depicted, the axis of rotation of the articulation element 1206 is substantially horizontal, so as to permit body portions 1202, 1204 to move relative to one another in a substantially vertical direction, thus increasing terrain compliance, as shown in FIG. 12B. This articulating ability of the wheeled platform 1200 may be advantageously employed in ascending or descending pitches or stairs, as shown in FIG. 12B.

As in other embodiments discussed herein, motors or other motion-control elements (not shown in FIGS. 12A and 12B) can be employed to control the angle of body portion 1204 relative to body portion 1202 to facilitate ascending and descending, or reduce frictional losses while moving across relatively smooth surfaces.

The diameter of the wheel elements, wheel spacing, platform-to-wheel spatial displacement, and body portion dimensions can be selected such that the platform is sufficiently high to avoid contact with obstacles or terrain elements, such as stairs. In particular, the wheels in this embodiment are disposed sufficiently close together, and wheel diameter and platform-to-wheel displacement is selected such that the platform can transverse stairs or other obstacles, with the platform having sufficient ground clearance to avoid contact with the nose of each stair.

It will be understood that more than one articulation element can be used, to further segment the body or chassis of the platform 1200, and that such articulation elements may have an axis of rotation substantially parallel to a longitudinal axis of the platform 1200. In this way, right/left or port/starboard articulation may be provided, in addition to fore/aft articulation. In addition, more or fewer than 6 wheels on each side may be utilized.

In this embodiment, the wheels on each side of the platform may be disposed all in a row, rather than having the intermediate wheels spaced wider apart (i.e., presenting a wider track) than the corner wheels. Alternatively, it may be useful to have at least one intermediate wheel element on each side displaced outwardly, as in the "flipper" embodiment of FIGS. 1-7 and the "tail" embodiment of FIGS. 8-11.

Patterned Wheel Elements:

The use of one or more studded, scalloped or otherwise patterned wheel elements (or, in some cases, the tread portion of such wheel elements) at certain positions around the wheeled platform has been demonstrated to be advantageous in certain applications. Examples of such wheel elements are depicted in FIGS. 13A-13E. As shown therein, wheel elements 1300 that may be utilized in connection with the invention may include a wheel portion 1302 having a hub 1304; and a tire portion 1306 having sidewalls 1308, 1310, and a tread portion 1312 that can be either smooth or patterned. This pattern, in turn, may be studded, scalloped or other some similar pattern, whether regular or irregular, symmetrical or asymmetrical. One such pattern, shown in FIGS. 13A-13E, consists of raised, spaced apart blocks 1314. The pattern shown in FIGS. 13A-13E has been demonstrated to be advantageous in platforms intended to travel frequently over bullnosed stairs, since the concavity of the scallop portion can effectively engage the rounded (bullnoses) leading edge of each stair-step, increasing traction and reducing slippage.

A particular practice of the invention utilizes scalloped wheel elements at the corners of the platform and smooth wheel elements for at least one of intermediate wheel elements on each side. The use of smooth wheel elements at the intermediate or center positions on, for example, a 6-wheeled platform, facilitates spins and turn-in-place, while maintaining the terrain-handling advantages (e.g., stair-climbing) afforded by scalloped wheel elements at the 4 corners.

While the use of patterned wheel elements has been shown to be advantageous in certain applications, it will be understood that the invention can be practiced without the use of such wheel elements. Similarly, the invention can be practiced with different forms of wheel/tire elements, and tires (as contrasted with wheel elements) can be omitted.

Figure 14:
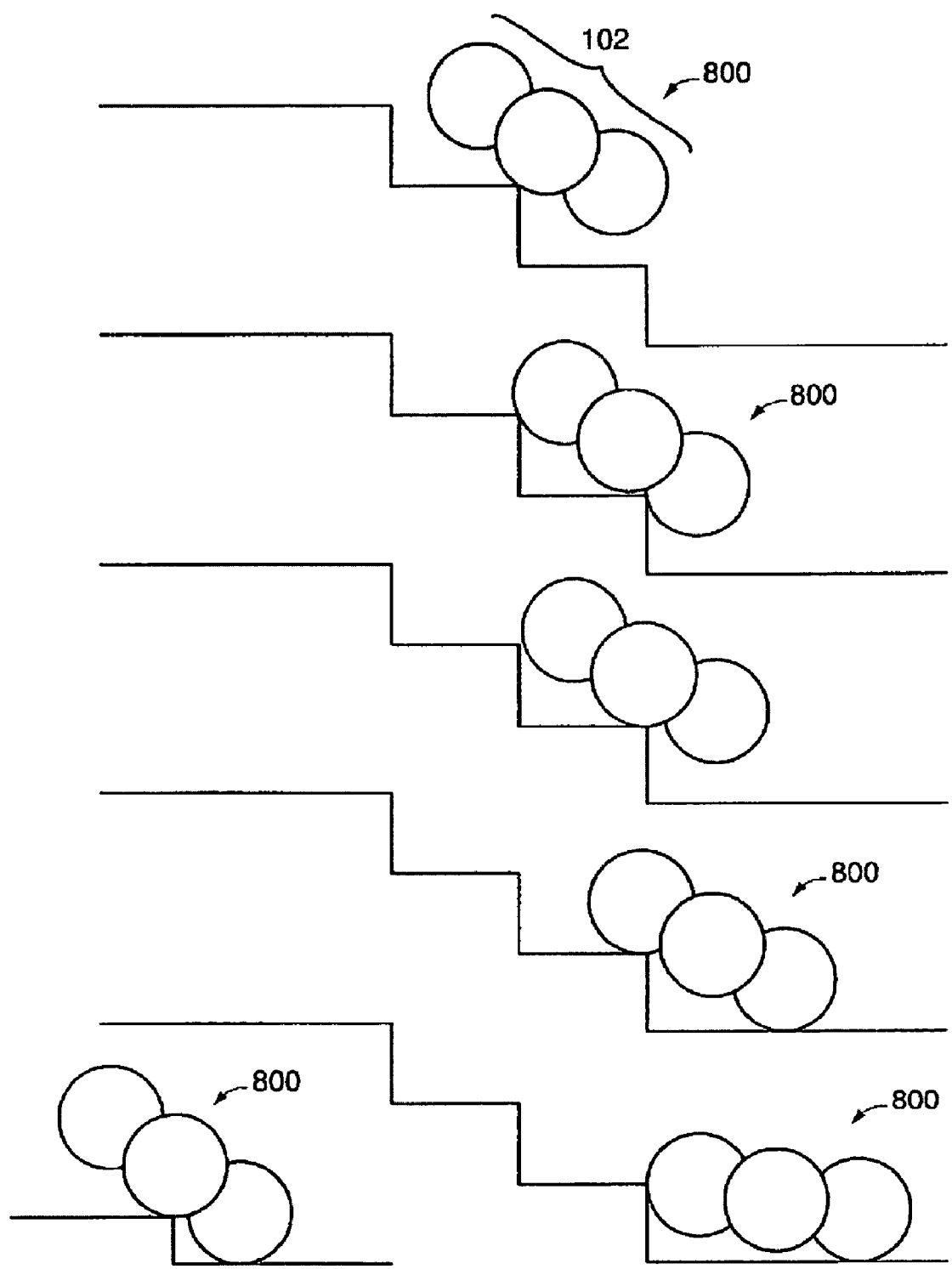
FIG. 14 is a schematic diagram of one embodiment of a wheeled platform in accordance with the invention ascending or descending stairs.
Figure 15A:
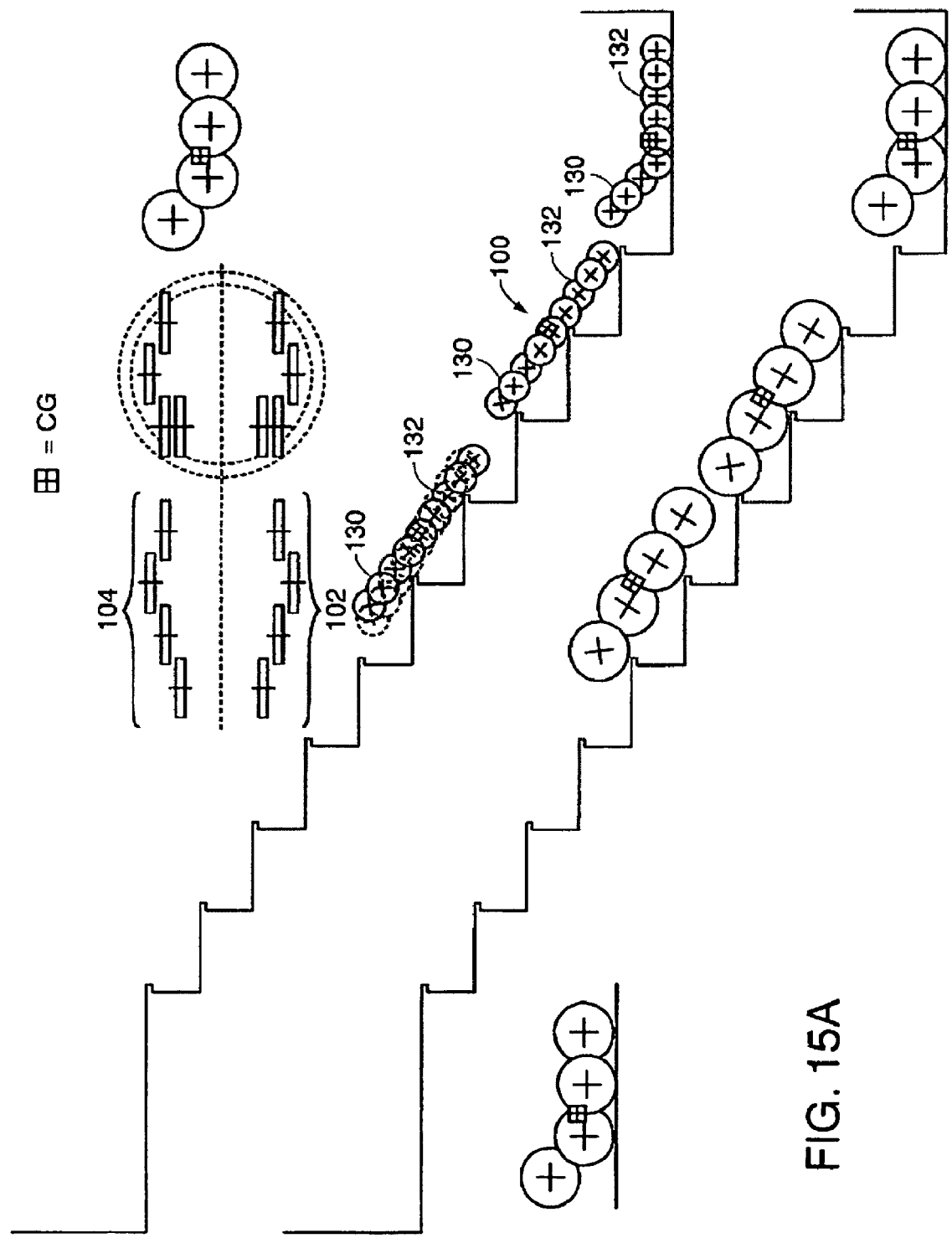
FIGS. 15A, 15B and 15C are further schematic diagrams of one embodiment of a wheeled platform in accordance with the invention ascending or descending stairs.
Figure 15B:
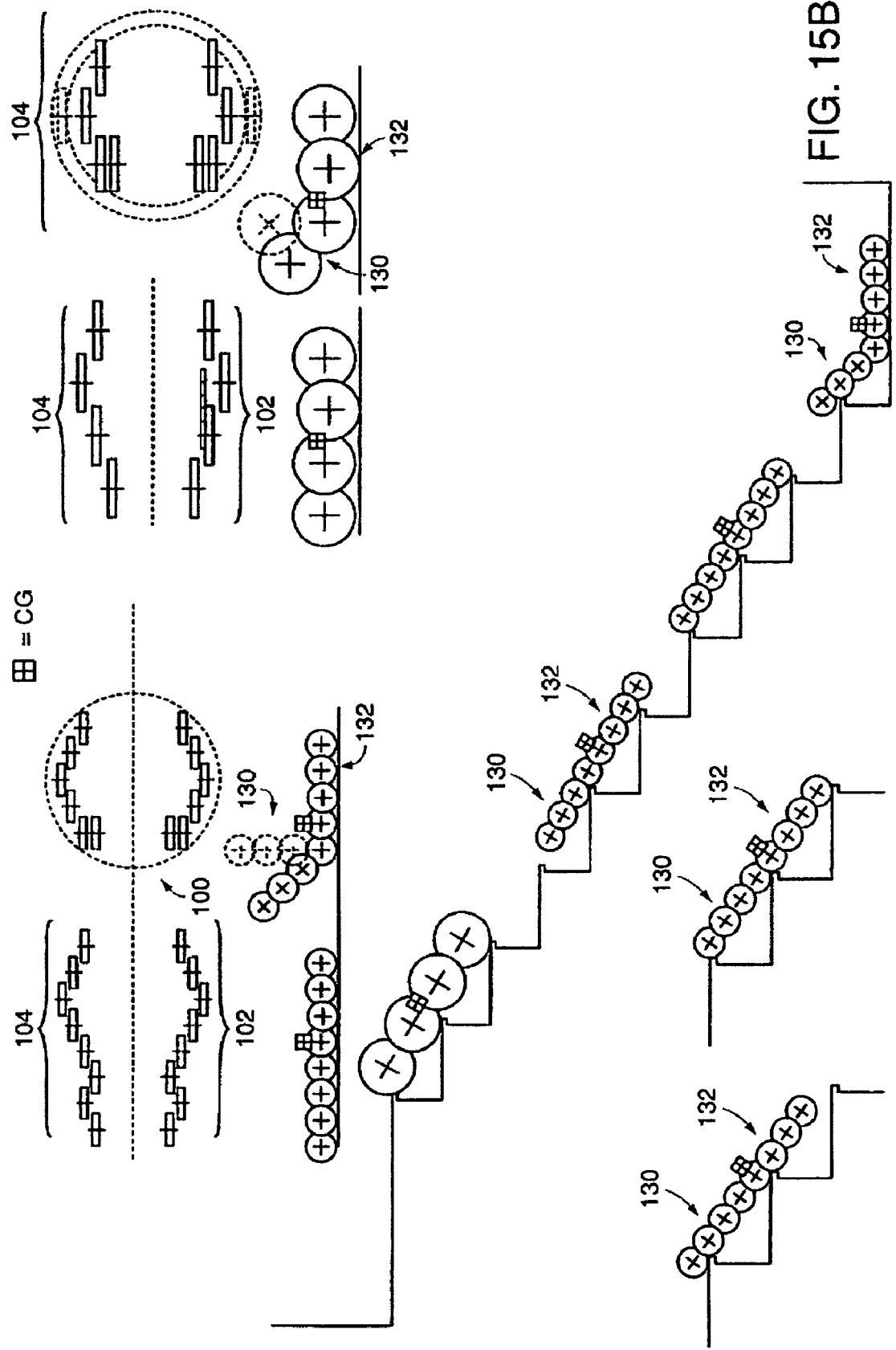
Figure 15C:
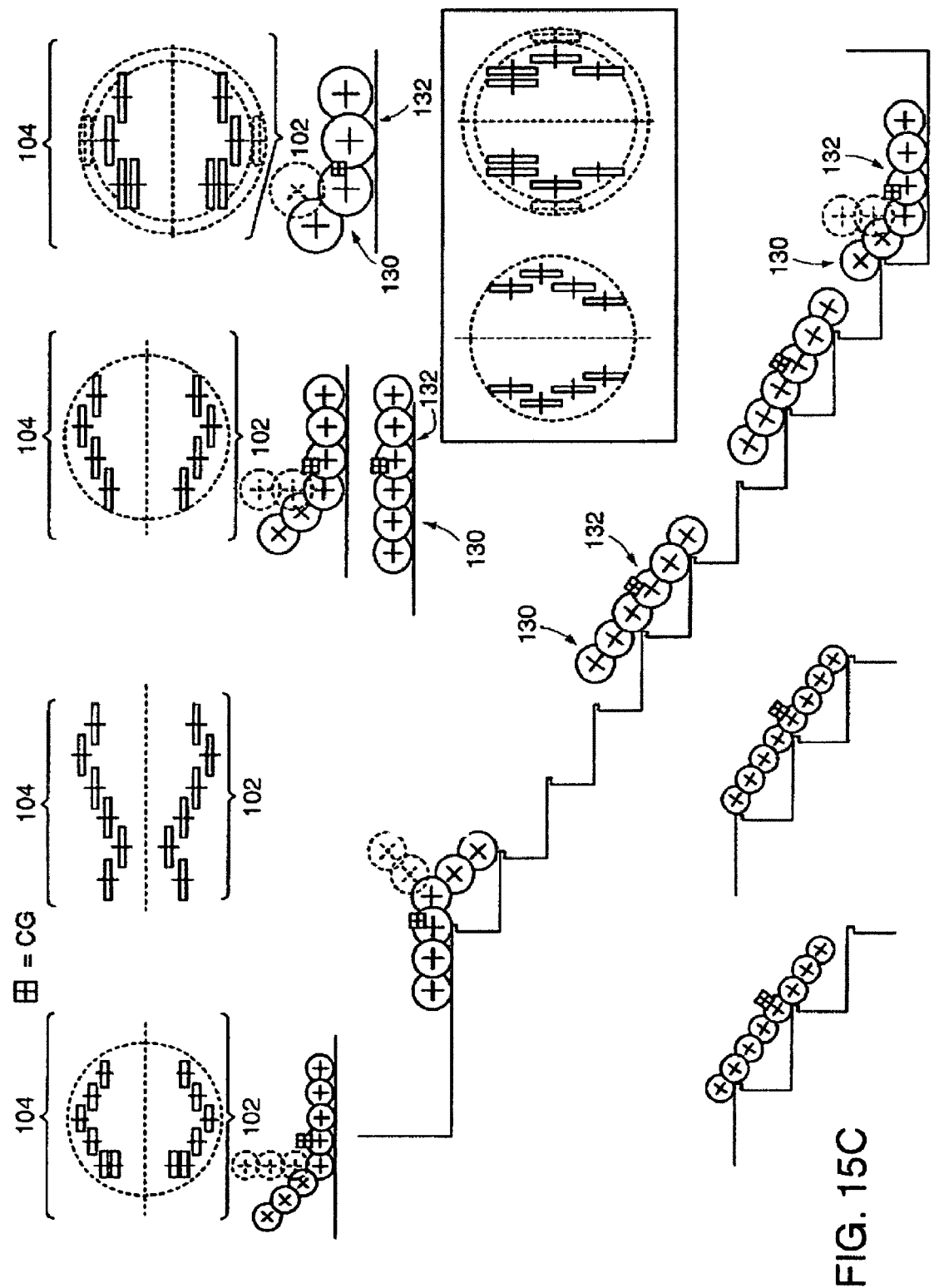

Selection Criteria for Stair-Climbing:

In the case of platforms useful in stair-climbing and descending, it has been found that the selection of wheel element diameter, axle count and axle spacing can be made with recognition of the requirements and vehicle dynamics of stair climbing and descending. FIGS. 14-15C depict various platform embodiments in accordance with the invention in stair ascending/descending modes.

As depicted therein, in flipper embodiments, descents may be accomplished with the platform arrayed flipper-first ("forward"), or flipper-last ("backward"). For forward descents, the flipper angle may be controlled to prevent the platform from toppling off the landing at the top of a flight of steps; or to smooth out the transition off the stairs onto the bottom landing, although neither operation is necessary for successful descents.

In typical operation on level, hilly or uneven ground, the platform and its flipper can be operated as depicted in FIGS. 1B and 15A-15C, with the wheels of the flipper well clear of the ground. In a preferred embodiment, the center of gravity (CG) is well forward; and with the forward CG, the platform at equilibrium on flat ground rests or operates on the wheels of other axles.

The platform can address stairs in the same configuration, with the flipper raised sufficiently for the wheels of the fore axle to climb over the first step. Once the first step is attained by the first axle, the articulated flipper can be lowered to horizontal, or slightly lower, with respect to the plane of the base, and the platform can proceed up the stairs in this configuration, approximately as shown in FIGS. 15A-15C. A more active control of the flipper angle with respect to the base can be useful for ascents of uneven steps, slippery stairs, or for smoothness of operation, although such active control is not necessary.

CONCLUSION

The disclosed invention thus provides wheeled platforms ideally suited to high-mobility, high-agility applications, including transport, robotic devices and the like, useful on rugged terrain, steep pitches, and stairs, whether indoors or outdoors. The structures disclosed are robust, reliable, and conservative of battery or other energy sources, while providing enhanced abilities to traverse challenging terrain and ascend or descend stairs and other obstacles. The disclosed platforms can be relatively compact, but scalable by selection of components and overall dimensions to adapt to various expected (and unexpected) terrain requirements.

It will be appreciated by those skilled in the art that the present invention may be practiced in connection with details that differ from the specific examples of implementation set forth herein, and can be implemented in devices, systems and methods differing from those shown. Thus, the details set forth herein are provided by way of illustration rather than limitation, and the invention is limited only by the scope of the appended claims.

We claim:

1. A wheeled structure comprising:
   a body;
   right and left sets of forward and rearward wheels rotatably coupled to corresponding sides of the body, at least one wheel of each set of wheels driven to propel the wheeled structure;
   a non-articulated tail element extending from a first end pivotally coupled to the body by an articulation element and terminating at an element-free second end; and
   a drive module coupled to the tail element to control the movement of the tail element between a first, stowed position, wherein the tail element and element-free second end of the tail element are pivoted to lay along the body, and a second, non-stowed position where the tail element can make selective contact with a plurality of steps of a stairway;
   wherein the tail element is configured to contact a first step of the stairway and lift the first end wheel to attain the first step.

2. The wheeled structure of claim 1, wherein to make selective contact with a stairway, the tail element is pivotable through a continuous range of articulated positions about the articulation element.

3. The wheeled structure of claim 1, wherein the tail element can make selective contact with a trailing step of the stairway.

4. The wheeled structure of claim 1, wherein the articulation element is a hinge.

5. The wheeled structure of claim 1, wherein the articulation element is a pivot.

6. The wheeled structure of claim 1, wherein the articulation element is a flexible body portion.

7. The wheeled structure of claim 1, wherein the tail element is straight.

8. The wheeled structure of claim 1, wherein when the tail element is articulated furthest forward with respect to the body, the tail is long enough to contact a stairway step forward of the first end wheel.

9. A wheeled structure comprising:
- a body having first and second ends;
- right and left sets of forward and rearward wheels rotatably coupled to corresponding sides of the body, at least one wheel of each set of wheels driven to propel the wheeled structure;
- a non-articulated tail element extending from a first end pivotally coupled to the body by an articulation element and terminating at an element-free second end; and
- a drive module coupled to the tail element to control the movement of the tail element between a first, stowed position and a second, non-stowed position where the element-free second end of the tail element can make selective contact with a plurality of steps of a stairway;
- wherein the tail element is configured to rotate between a first position extending below the first end of the body and a second position extending past the opposite, second end of the body.

10. The wheeled structure of claim 9, wherein to make selective contact with a stairway, the tail element is pivotable through a continuous range of articulated positions about the articulation element.

11. The wheeled structure of claim 9, wherein the tail element can make selective contact with a trailing step of the stairway.

12. The wheeled structure of claim 9, wherein the articulation element is a hinge.

13. The wheeled structure of claim 9, wherein the articulation element is a pivot.

14. The wheeled structure of claim 9, wherein the articulation element is a flexible body portion.

15. The wheeled structure of claim 9, wherein the tail element is straight.

* * * * *